US012613803B2

(12) United States Patent
Shannon

(10) Patent No.: US 12,613,803 B2
(45) Date of Patent: Apr. 28, 2026

(54) CACHE MEMORY SYSTEM EMPLOYING A MULTIPLE-LEVEL HIERARCHY CACHE COHERENCY ARCHITECTURE

(71) Applicant: Ampere Computing LLC, Santa Clara, CA (US)

(72) Inventor: Richard James Shannon, Portland, OR (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 18/422,951

(22) Filed: Jan. 25, 2024

(65) Prior Publication Data

US 2025/0245156 A1 Jul. 31, 2025

(51) Int. Cl.
*G06F 12/0817* (2016.01)

(52) U.S. Cl.
CPC .... *G06F 12/0828* (2013.01); *G06F 2212/621* (2013.01)

(58) Field of Classification Search
CPC ........... G06F 12/0828; G06F 2212/621; G06F 12/0815–0837; G06F 12/084; G06F 12/0897; G06F 12/0811
USPC ........................................................ 711/141
See application file for complete search history.

(56) References Cited

U.S. PATENT DOCUMENTS 10,795,819 B1 * 10/2020 Pawlowski ......... G06F 12/0842
2015/0120998 A1 4/2015 Wang et al.
2019/0220408 A1 7/2019 Retter et al.
2021/0141726 A1 * 5/2021 Robinson ............ G06F 12/0837
2022/0004439 A1 * 1/2022 Abraham ............ G06F 9/30101
2023/0041702 A1 2/2023 Williams et al.
2023/0053530 A1 * 2/2023 Hammarlund ........ G06F 13/161
2023/0418750 A1 * 12/2023 Hilewitz ............ G06F 12/0846
2024/0086325 A1 * 3/2024 Song ..................... G06F 12/123

OTHER PUBLICATIONS

ARM, "AMBAR 5 CHI Architecture Specification," ARM IHI 0050E.b, Aug. 2021, Arm Limited, 508 pages.
(Continued)

*Primary Examiner* — Jared I Rutz
*Assistant Examiner* — Wei Ma
(74) *Attorney, Agent, or Firm* — Withrow & Terranova, PLLC

(57) ABSTRACT

Cache memory systems employing multiple-level hierarchy cache coherency architecture, and related methods and computer-readable media. A processor-based system includes separate dies that each have a processor and local cache memory logically forming a portion of global cache memory for a system address space. To provide a single point of cache coherency in the global cache memory, the processor-based system includes a proxy cache controller circuit in each die, and a global cache controller circuit. The global cache controller circuit can communicate with the proxy cache controller circuits to maintain single point of cache coherency in the global cache memory. Thus, a cache coherency protocol based on a single point of cache coherency can be implemented. However, the proxy cache controller circuits are also capable of locally servicing memory requests solely within its die, when possible to maintain cache coherency, to provide lower latency memory transactions

31 Claims, 13 Drawing Sheets

(56) References Cited

OTHER PUBLICATIONS

International Search Report and Written Opinion for International Patent Application No. PCT/US2025/012572, mailed Mar. 26, 2025, 13 pages.
Written Opinion for International Patent Application No. PCT/US2025/012572, mailed Dec. 18, 2025, 8 pages.

* cited by examiner 200, 200R

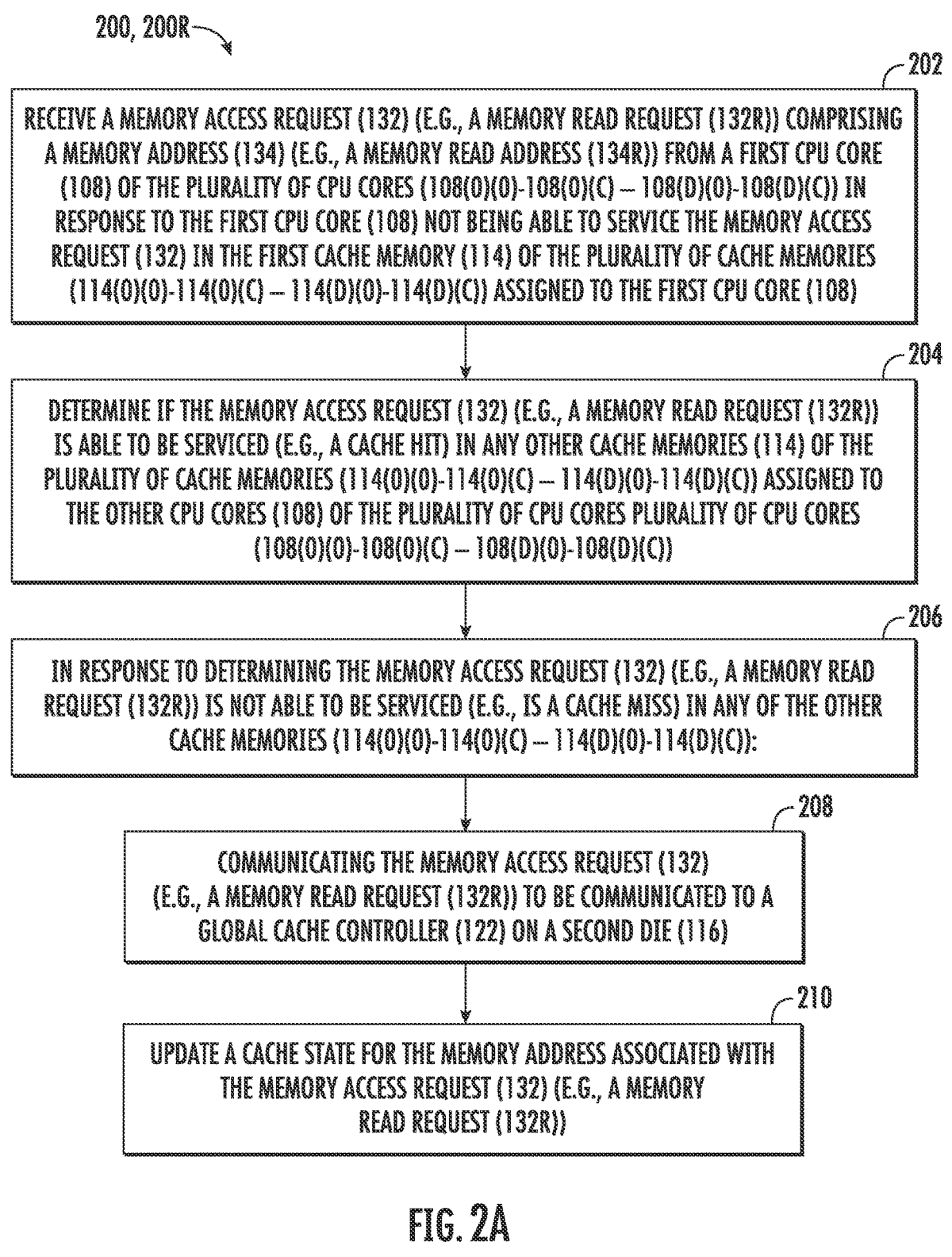

202

RECEIVE A MEMORY ACCESS REQUEST (132) (E.G., A MEMORY READ REQUEST (132R)) COMPRISING A MEMORY ADDRESS (134) (E.G., A MEMORY READ ADDRESS (134R)) FROM A FIRST CPU CORE (108) OF THE PLURALITY OF CPU CORES (108(0)(0)-108(0)(C) — 108(D)(0)-108(D)(C)) IN RESPONSE TO THE FIRST CPU CORE (108) NOT BEING ABLE TO SERVICE THE MEMORY ACCESS REQUEST (132) IN THE FIRST CACHE MEMORY (114) OF THE PLURALITY OF CACHE MEMORIES (114(0)(0)-114(0)(C) — 114(D)(0)-114(D)(C)) ASSIGNED TO THE FIRST CPU CORE (108)

204

DETERMINE IF THE MEMORY ACCESS REQUEST (132) (E.G., A MEMORY READ REQUEST (132R)) IS ABLE TO BE SERVICED (E.G., A CACHE HIT) IN ANY OTHER CACHE MEMORIES (114) OF THE PLURALITY OF CACHE MEMORIES (114(0)(0)-114(0)(C) — 114(D)(0)-114(D)(C)) ASSIGNED TO THE OTHER CPU CORES (108) OF THE PLURALITY OF CPU CORES PLURALITY OF CPU CORES (108(0)(0)-108(0)(C) — 108(D)(0)-108(D)(C))

206

IN RESPONSE TO DETERMINING THE MEMORY ACCESS REQUEST (132) (E.G., A MEMORY READ REQUEST (132R)) IS NOT ABLE TO BE SERVICED (E.G., IS A CACHE MISS) IN ANY OF THE OTHER CACHE MEMORIES (114(0)(0)-114(0)(C) — 114(D)(0)-114(D)(C)):

208

COMMUNICATING THE MEMORY ACCESS REQUEST (132) (E.G., A MEMORY READ REQUEST (132R)) TO BE COMMUNICATED TO A GLOBAL CACHE CONTROLLER (122) ON A SECOND DIE (116)

210

UPDATE A CACHE STATE FOR THE MEMORY ADDRESS ASSOCIATED WITH THE MEMORY ACCESS REQUEST (132) (E.G., A MEMORY READ REQUEST (132R))

FIG. 2A

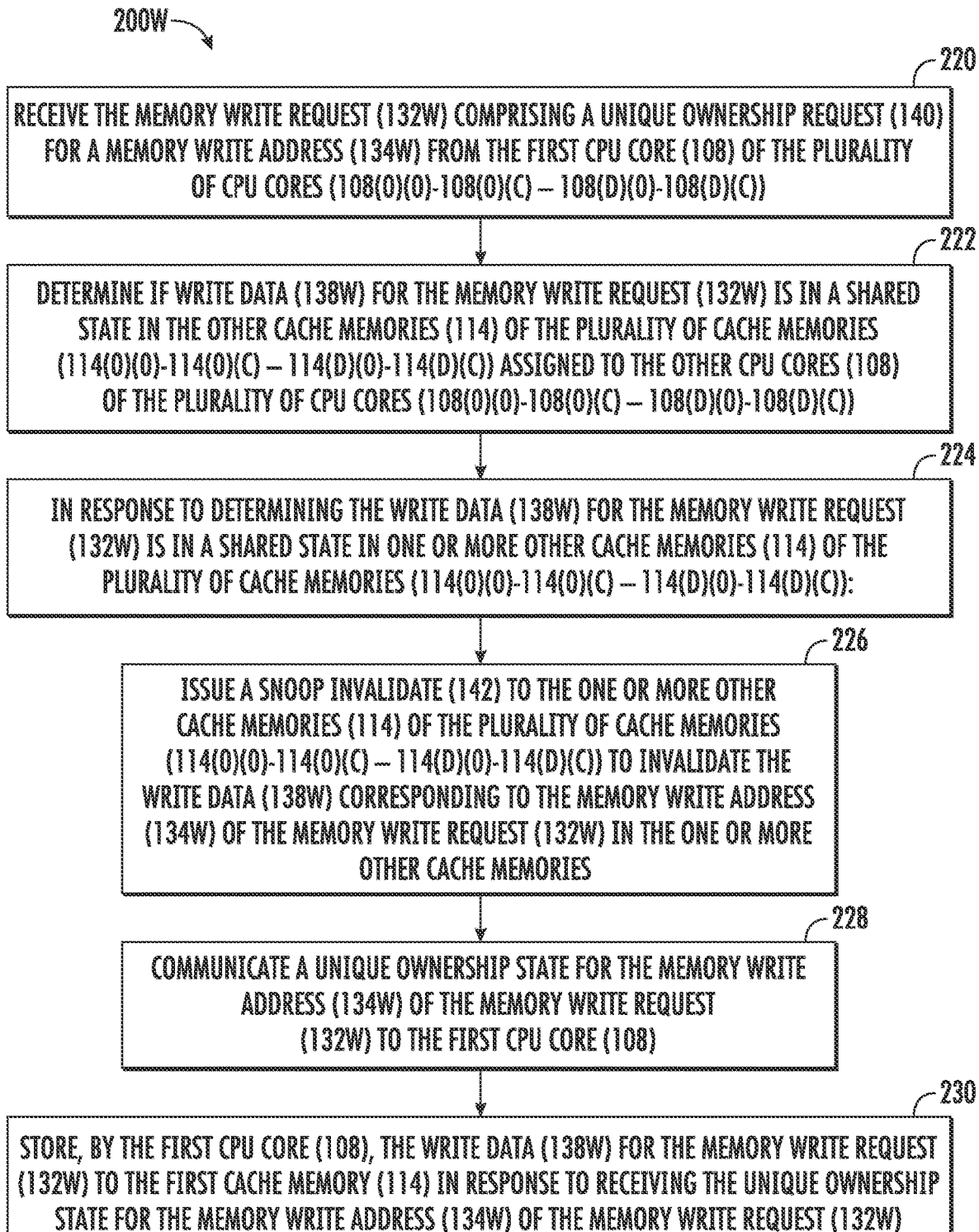

200W

220
RECEIVE THE MEMORY WRITE REQUEST (132W) COMPRISING A UNIQUE OWNERSHIP REQUEST (140) FOR A MEMORY WRITE ADDRESS (134W) FROM THE FIRST CPU CORE (108) OF THE PLURALITY OF CPU CORES (108(0)(0)-108(0)(C) — 108(D)(0)-108(D)(C))

222
DETERMINE IF WRITE DATA (138W) FOR THE MEMORY WRITE REQUEST (132W) IS IN A SHARED STATE IN THE OTHER CACHE MEMORIES (114) OF THE PLURALITY OF CACHE MEMORIES (114(0)(0)-114(0)(C) — 114(D)(0)-114(D)(C)) ASSIGNED TO THE OTHER CPU CORES (108) OF THE PLURALITY OF CPU CORES (108(0)(0)-108(0)(C) — 108(D)(0)-108(D)(C))

224
IN RESPONSE TO DETERMINING THE WRITE DATA (138W) FOR THE MEMORY WRITE REQUEST (132W) IS IN A SHARED STATE IN ONE OR MORE OTHER CACHE MEMORIES (114) OF THE PLURALITY OF CACHE MEMORIES (114(0)(0)-114(0)(C) — 114(D)(0)-114(D)(C)):

226
ISSUE A SNOOP INVALIDATE (142) TO THE ONE OR MORE OTHER CACHE MEMORIES (114) OF THE PLURALITY OF CACHE MEMORIES (114(0)(0)-114(0)(C) — 114(D)(0)-114(D)(C)) TO INVALIDATE THE WRITE DATA (138W) CORRESPONDING TO THE MEMORY WRITE ADDRESS (134W) OF THE MEMORY WRITE REQUEST (132W) IN THE ONE OR MORE OTHER CACHE MEMORIES

228
COMMUNICATE A UNIQUE OWNERSHIP STATE FOR THE MEMORY WRITE ADDRESS (134W) OF THE MEMORY WRITE REQUEST (132W) TO THE FIRST CPU CORE (108)

230
STORE, BY THE FIRST CPU CORE (108), THE WRITE DATA (138W) FOR THE MEMORY WRITE REQUEST (132W) TO THE FIRST CACHE MEMORY (114) IN RESPONSE TO RECEIVING THE UNIQUE OWNERSHIP STATE FOR THE MEMORY WRITE ADDRESS (134W) OF THE MEMORY WRITE REQUEST (132W)

FIG. 2B

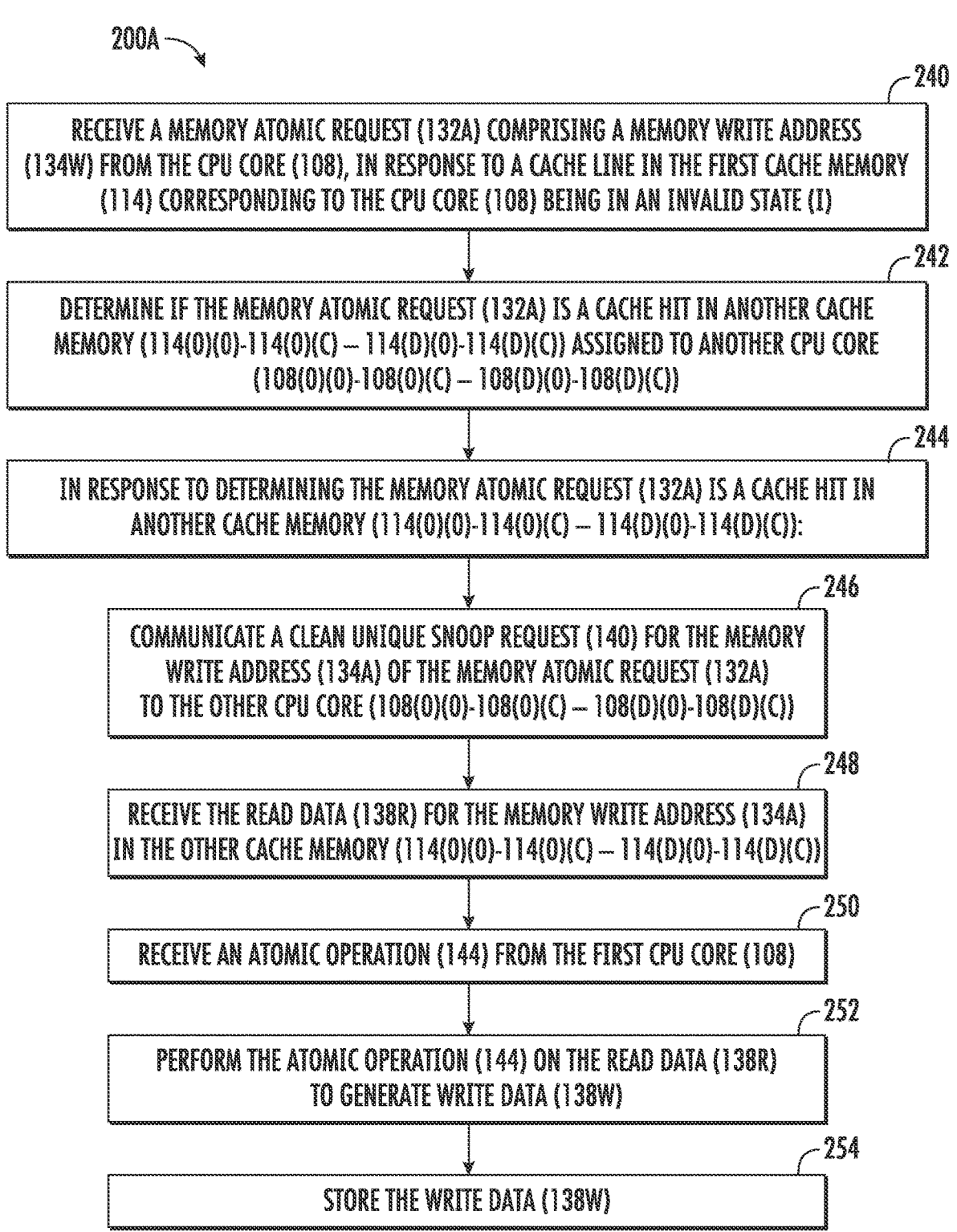

200A

240

RECEIVE A MEMORY ATOMIC REQUEST (132A) COMPRISING A MEMORY WRITE ADDRESS (134W) FROM THE CPU CORE (108), IN RESPONSE TO A CACHE LINE IN THE FIRST CACHE MEMORY (114) CORRESPONDING TO THE CPU CORE (108) BEING IN AN INVALID STATE (I)

242

DETERMINE IF THE MEMORY ATOMIC REQUEST (132A) IS A CACHE HIT IN ANOTHER CACHE MEMORY (114(0)(0)-114(0)(C) – 114(D)(0)-114(D)(C)) ASSIGNED TO ANOTHER CPU CORE (108(0)(0)-108(0)(C) – 108(D)(0)-108(D)(C))

244

IN RESPONSE TO DETERMINING THE MEMORY ATOMIC REQUEST (132A) IS A CACHE HIT IN ANOTHER CACHE MEMORY (114(0)(0)-114(0)(C) – 114(D)(0)-114(D)(C)):

246

COMMUNICATE A CLEAN UNIQUE SNOOP REQUEST (140) FOR THE MEMORY WRITE ADDRESS (134A) OF THE MEMORY ATOMIC REQUEST (132A) TO THE OTHER CPU CORE (108(0)(0)-108(0)(C) – 108(D)(0)-108(D)(C))

248

RECEIVE THE READ DATA (138R) FOR THE MEMORY WRITE ADDRESS (134A) IN THE OTHER CACHE MEMORY (114(0)(0)-114(0)(C) – 114(D)(0)-114(D)(C))

250

RECEIVE AN ATOMIC OPERATION (144) FROM THE FIRST CPU CORE (108)

252

PERFORM THE ATOMIC OPERATION (144) ON THE READ DATA (138R) TO GENERATE WRITE DATA (138W)

254

STORE THE WRITE DATA (138W)

FIG. 2C

CACHE MEMORY SYSTEM EMPLOYING A MULTIPLE-LEVEL HIERARCHY CACHE COHERENCY ARCHITECTURE

FIELD OF THE DISCLOSURE

The technology of the disclosure relates to a cache memory system that is provided in a processor-based system and that includes multiple caches organized in a cache hierarchy supporting access to cache data, and more specifically to maintaining cache coherency in the cache memory system. The cache memory system is particularly suited for a multi-die processor-based system.

BACKGROUND

In order to provide low-latency retrieval of instructions and/or data (as compared to the latency of transactions to a main memory system), microprocessors may conventionally include a cache memory system. The cache memory system includes one or more cache memories (also referred to as "cache") that may be arranged in a hierarchical manner. For example, the cache memory system may include a level 0 (L0) cache(s) within a central processing unit (CPU) or each CPU core, a level 1 (L1) cache, level 2 (L2) cache, and level 3 (L3) cache. In a multi-core or multi-processor system, each CPU core or processor typically has an L0 and/or L1 cache, which is used to store frequently accessed data to improve performance. The L0 cache may be the relatively smallest and lowest latency cache, with the caches increasing in size and latency up through the L3 cache, which may be the largest but with the longest latency compared to the other caches. In some aspects, one or more of the levels of cache hierarchy may have split instruction and data caches (i.e., the L0 cache level may comprise split L0 instruction and L0 data caches), whereas other levels of the cache hierarchy may contain both instructions and data. Some cache levels of a cache memory system may be "private" to the microprocessor or, in the case of a multi-core microprocessor, may be private to one or more individual core(s) (meaning that such private caches are only visible and accessible to the associated microprocessor or individual core(s)). Other cache levels of a cache memory system, despite being physically located with a particular microprocessor, may be shared across and usable by one or more other microprocessors in a system.

Cache coherency must be maintained within a cache memory system. Cache coherency refers to the consistency of data stored in different caches within a cache memory system. The goal of cache coherency is to ensure that all processors in a system see a consistent view of memory, despite the presence of multiple caches that can store copies of data. When multiple cores or processors access and modify the same memory locations, it is possible for the data in their respective caches to become inconsistent. Cache coherency mechanisms are put in place to prevent or resolve these inconsistencies. For example, the Advanced Microprocessor Bus Architecture (AMBA) coherent hub interface (CHI) specification from Arm Holdings, plc defines a hardware-based protocol for maintaining coherency of a system memory address space across multiple caching agents (e.g., CPU cores) in a processor-based system. The AMBA CHI specification involves a system of components in a processor-based system having specific roles and responsibilities to maintain cache coherency in a cache memory system in the processor-based system. The AMBA CHI specification calls for a hardware coherency manager (also known as a "home node" or "home agent") to be defined as the point of coherence (PoC) for the cache memory system. The hardware coherency manager is responsible for ensuring coherency for a set of system addresses in the processor-based system. According to the architecture in the AMBA CHI specification, if a requesting node (e.g., a CPU core) cannot service a memory request from access to a local private cache, the requesting node sends a cache request to the hardware coherency manager as the sole coherency manager. The hardware coherency manager then issues snoop requests to other remote nodes as dictated by the AMBA CHI protocol and also propagates memory read and write requests to a corresponding memory controller.

In a single-socket processor-based system wherein the CPU cores are provided in a single semiconductor die ("die"), the hardware coherency manager can communicate snoop requests to the CPU cores within the single die. However, in a multi-die and/or multi-socket processor-based system that includes two (2) or more processors that share a single system memory address space contained in separate dies, a die-to-die (D2D) communication interface(s) is required to allow for inter-die and inter-socket communications. To maintain cache coherency, the hardware coherency manager must communicate through the D2D communication interface(s) to multiple processors in the separate dies. This can cause signification performance issues for memory accesses due to the additional latency and bandwidth limitations of inter-die and inter-socket communications.

SUMMARY

Aspects disclosed herein include cache memory systems employing a multiple-level hierarchy cache coherency architecture particularly suited, but not limited to, a multi-die processor-based system. Related methods and computer-readable media are also disclosed. In exemplary aspects, the processor-based system includes a plurality of separate dies (e.g., compute dies on multiple sockets) that each have a processor (e.g., with multiple central processing unit (CPU) cores) configured to execute instructions to perform tasks. Each die includes a local cache memory as part of the cache memory system for storing cached data to service memory access requests from the processor (e.g., its CPU cores) on its die, when possible. In this manner, lower latency memory transactions are supported within each die if a memory access request can be serviced by solely managing the memory transaction through the local cache memory on its die. However, it is desired that the local cache memories distributed over the plurality of dies logically form one global cache memory and a cache coherency protocol can be implemented for maintaining cache coherency. Forming a global cache memory logically from the local cache memories distributed over the plurality of dies may also support a larger-sized global cache memory for the processor-based system.

In this regard, to provide a single point of cache coherency for the processor-based system while providing a global cache memory that logically includes local cache memories distributed over the plurality of dies, the processor-based system includes a plurality of proxy cache controller circuits on each die, and a global cache controller circuit. The proxy cache controller circuits are each configured to service memory access requests over the entire system address space of the processor-based system from the processors on its die. The global cache controller circuit is configured to communicate with each of the proxy cache controller circuits to maintain cache coherency over the global cache memory logically formed from the distributed local cache memories. The global cache controller circuit may be contained on a separate die from the dies or contained within a die of the plurality of dies. Thus, if a memory access request can be fully serviced within a given die and still maintain cache coherency of the global cache memory (e.g., a read request that validly hits to a cache line in a local cache memory, or accessed after unique ownership of the cache line is obtained), the proxy cache controller circuit can autonomously service the memory access request from the local cache memory contained within its die, when possible to maintain cache coherency, without the need for communication to the global cache controller circuit to support a lower-latency memory transaction. However, if a memory access request cannot be serviced within a given die (e.g., a write request to a cache line that is not uniquely owned by a local cache memory), the proxy cache controller circuit is configured to communicate with the global cache controller circuit. The global cache controller circuit is configured to communicate with the other proxy cache controller circuit(s) in a hierarchical fashion, as needed, that manage access to their respective local cache memory as part of the global cache memory, to maintain cache coherency of the global cache memory.

In this manner, as an example, a cache coherency protocol that is based on a single point of cache coherency can be implemented in the multi-die processor-based system through the global cache controller circuit, but the proxy cache controller circuits in each die are still capable of servicing memory access requests contained within its die, when possible, for lower-latency memory transactions. In other words, because the proxy cache controller circuits are capable of servicing memory access requests solely within its die that can be so done and still maintain cache coherency of the global cache memory, there is not a need to configure the proxy cache controller circuits to always communicate memory access requests through the global cache controller circuit to maintain cache coherency of the global cache memory. Communication to the global cache controller circuit for a memory transaction comes with a cost of additional latency for the memory transaction.

In other exemplary aspects, the cache memory system is configured to perform snooping in a hierarchical fashion. In an example, each proxy cache controller circuit maintains a local cache line directory that tracks where each cache line is cached across CPU cores on the same die. The global cache controller circuit also maintains a global cache line directory that tracks where each cache line is cached across the local cache memories in the dies, that logically form the global cache memory. If there are other caching devices in the processor-based system, the local cache memories associated with the other caching devices are also tracked by the global cache controller circuit using the global cache line directory. Thus, when processing coherent memory access requests, each proxy cache controller circuit is configured to access its local cache line directory to determine if the memory access request is to a cache line contained within its local cache memory and to determine if the proxy cache controller circuit needs to issue a snoop request through the global cache controller circuit. The global cache controller circuit is configured to send snoop requests to the proxy cache controller circuits (or other coupled caching devices) on the dies, which in turn can be communicated to a processor of its die to update the local cache memory on the die.

In other exemplary aspects, the processor-based system includes one global cache controller circuit for each system address space addressable by a processor. Thus, if all the processors on the dies are each configured to address the entire system address space of the processor-based system, only one global cache controller circuit is required. However, if any of the processors on the dies are configured to address different system address spaces of the processor-based system, multiple global cache controller circuits can be provided and assigned to each unique system address space, with the proxy cache controller circuit assigned to a given processor configured to communicate with the global cache controller circuit associated with the processor's system address space.

In this regard, in one exemplary aspect, a semiconductor die (die) is provided. The die comprises a processor comprising a plurality of CPU cores, and a local cache memory comprising a plurality of cache memories each assigned to a CPU core of the plurality of CPU cores. The die also comprises a proxy cache controller circuit communicatively coupled to the plurality of CPU cores. The proxy cache controller circuit configured to receive a memory access request comprising a memory address from a first CPU core of the plurality of CPU cores in response to the first CPU core not being able to service the memory access request in a first cache memory of the plurality of cache memories assigned to the first CPU core. The proxy cache controller circuit also configured to determine if the memory access request is able to be serviced in any other cache memories of the plurality of cache memories assigned to the other CPU cores of the plurality of CPU cores. In response to determining the memory access request is not able to be serviced in any of the other cache memories, the proxy cache controller circuit also configured to communicate the memory access request to a global cache controller circuit on a second die, and update a cache state for the memory address associated with the memory access request.

In another exemplary aspect, a method of maintaining cache coherency in a multi-level hierarchy cache memory system is provided. The method comprises receiving in a proxy cache controller circuit on a first die and communicatively coupled to a plurality of CPU cores, a memory access request comprising a memory address from a first CPU core of the plurality of CPU cores in response to the first CPU core not being able to service the memory access request in a first cache memory of a plurality of cache memories assigned to the first CPU core. The method also comprises determining if the memory access request is able to be serviced in any other cache memories of the plurality of cache memories assigned each of the other CPU cores of the plurality of CPU cores. In response to determining the memory access request is not able to be serviced in any of the other cache memories, the method also comprises communicating the memory access request to a global cache controller circuit on a second die, and updating a cache state for the memory address associated with the memory access request.

In another exemplary aspect, a non-transitory computer-readable medium is provided. The non-transitory computer-readable medium has stored thereon computer executable instructions which, when executed by a proxy cache controller circuit on a first die and communicatively coupled to a plurality of CPU cores, cause the proxy cache controller circuit to: receive in a memory access request comprising a memory address from a first CPU core of the plurality of CPU cores in response to the first CPU core not being able to service the memory access request in a first cache memory of a plurality of cache memories assigned to the first CPU core; determine if the memory access request is able to be serviced in any other cache memories of the plurality of cache memories assigned each of the other CPU cores of the plurality of CPU cores;

and in response to determining the memory access request is not able to be serviced in any of the other cache memories: communicate the memory access request to a global cache controller circuit on a second die; and update a cache state for the memory address associated with the memory access request.

In another exemplary aspect, a processor-based system is provided. The processor-based system comprises a first semiconductor die (die), comprising: a first processor comprising one or more first CPU cores; a first local cache memory comprising one or more first cache memories each assigned to a first CPU core of the one or more first CPU cores; and a first proxy cache controller circuit communicatively coupled to the one or more first CPU cores. The processor-based system also comprises a second die, comprising: a second processor comprising one or more second CPU cores; a second local cache memory comprising one or more second cache memories each assigned to a second CPU core of the one or more second CPU cores; and a second proxy cache controller circuit communicatively coupled to the one or more second CPU cores. The processor-based system also comprises a cache memory system, comprising: a global cache controller circuit; the first proxy cache controller circuit; and the second proxy cache controller circuit. The first CPU core of the one or more first CPU cores is configured to: issue a memory access request to a memory address in a first cache memory of the one or more first cache memories assigned to the first CPU core; communicate the memory access request to the first proxy cache controller circuit in response to the first CPU core not being able to service the memory access request in the first cache memory. The first proxy cache controller circuit in the first CPU core is configured to: determine if the memory access request is able to be serviced in any first cache memory of the one or more first cache memories assigned to the other first CPU cores of the one or more first CPU cores; and in response to determining the memory access request is not able to be serviced in any of the other first cache memories: communicate the memory access request to the global cache controller circuit. The global cache controller circuit is configured to determine if the memory access request is able to be serviced in any second cache memory of the one or more second cache memories. In response to determining the memory access request is able to be serviced in a second cache memory of the one or more second cache memories, the global cache controller circuit is configured to communicate the memory access request to the second proxy cache controller circuit to be serviced in the second cache memory. The global cache controller circuit is configured to update a cache state for the memory address associated with the memory access request based on the serviced memory access request in the second local cache memory.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is a block diagram of an exemplary processor-based system that includes a multiple-level hierarchy cache system for a plurality of dies (e.g., compute dies) each having a processor, a local cache memory as part of a global cache memory, and a proxy cache controller circuit, wherein each proxy cache controller circuit is capable of locally servicing memory requests solely within its die, when possible to maintain cache coherency, to provide lower-latency memory transactions, and wherein the processor-based system further includes a global cache controller circuit configured to communicate with the proxy cache controller circuits to maintain a single point of cache coherency in the global cache memory;

FIG. 2A is a flowchart illustrating an exemplary process of a proxy cache controller circuit in the multiple-level hierarchy cache system in FIG. 1 performing a memory read request while maintaining cache coherency in its die, and configured to communicate the memory access request to the global cache controller circuit when the request is not able to be serviced in its die to maintain cache coherency in the global cache memory;

FIG. 2B is a flowchart illustrating an exemplary process of a proxy cache controller circuit in the multiple-level hierarchy cache system in FIG. 1 performing a memory write request to obtain a unique ownership cache state for data to be written while maintaining cache coherency in its die, and configured to communicate the memory write request to the global cache controller circuit to maintain cache coherency in the global cache memory;

FIG. 2C is a flowchart illustrating an exemplary process of a proxy cache controller circuit in the multiple-level hierarchy cache system in FIG. 1 performing a memory atomic request while maintaining cache coherency in its die, configured to communicate the memory atomic request to the global cache controller circuit when the request is not able to be serviced in its die to maintain cache coherency in the global cache memory;

Figure 1:
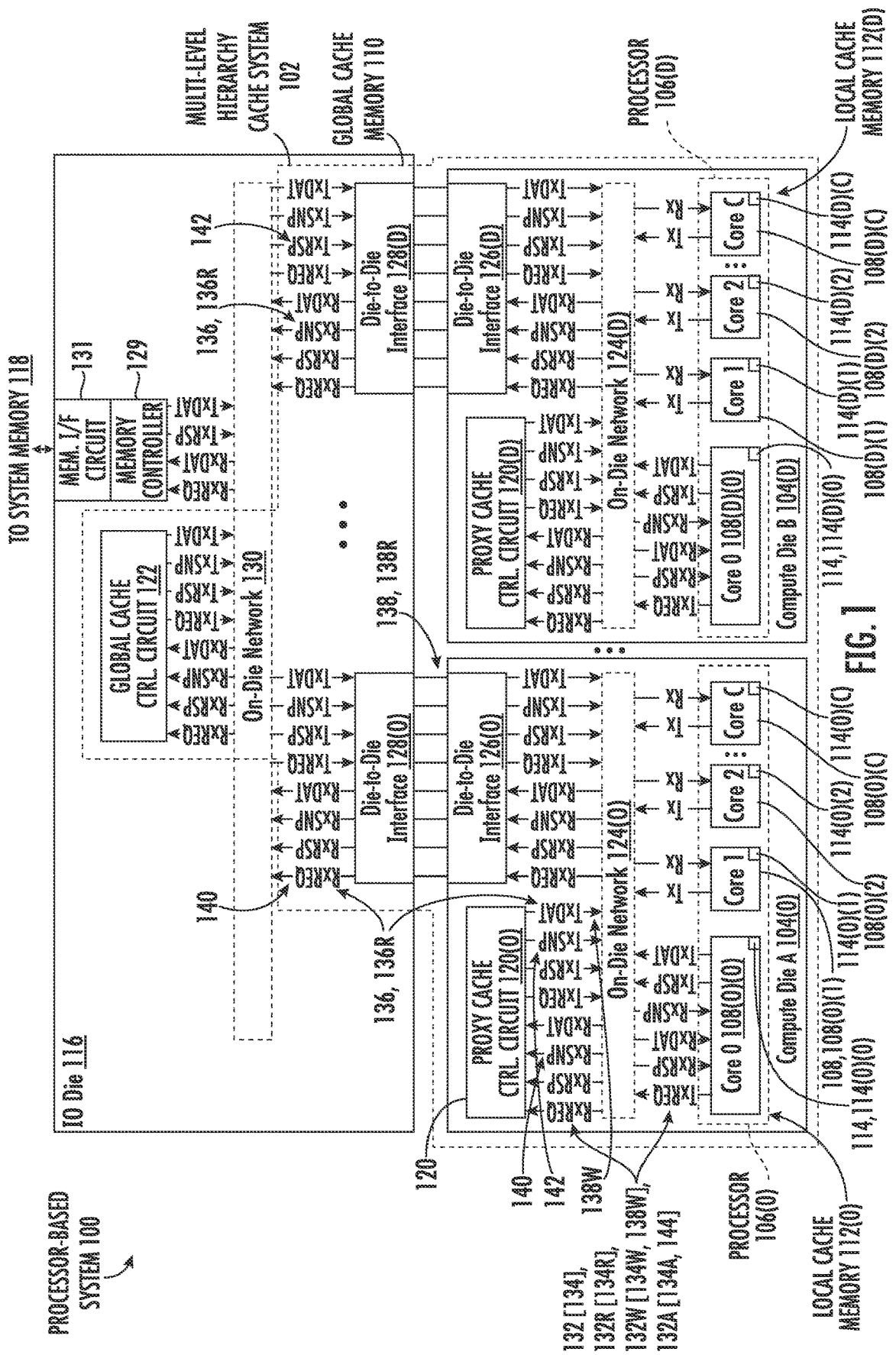
Figure 3A:
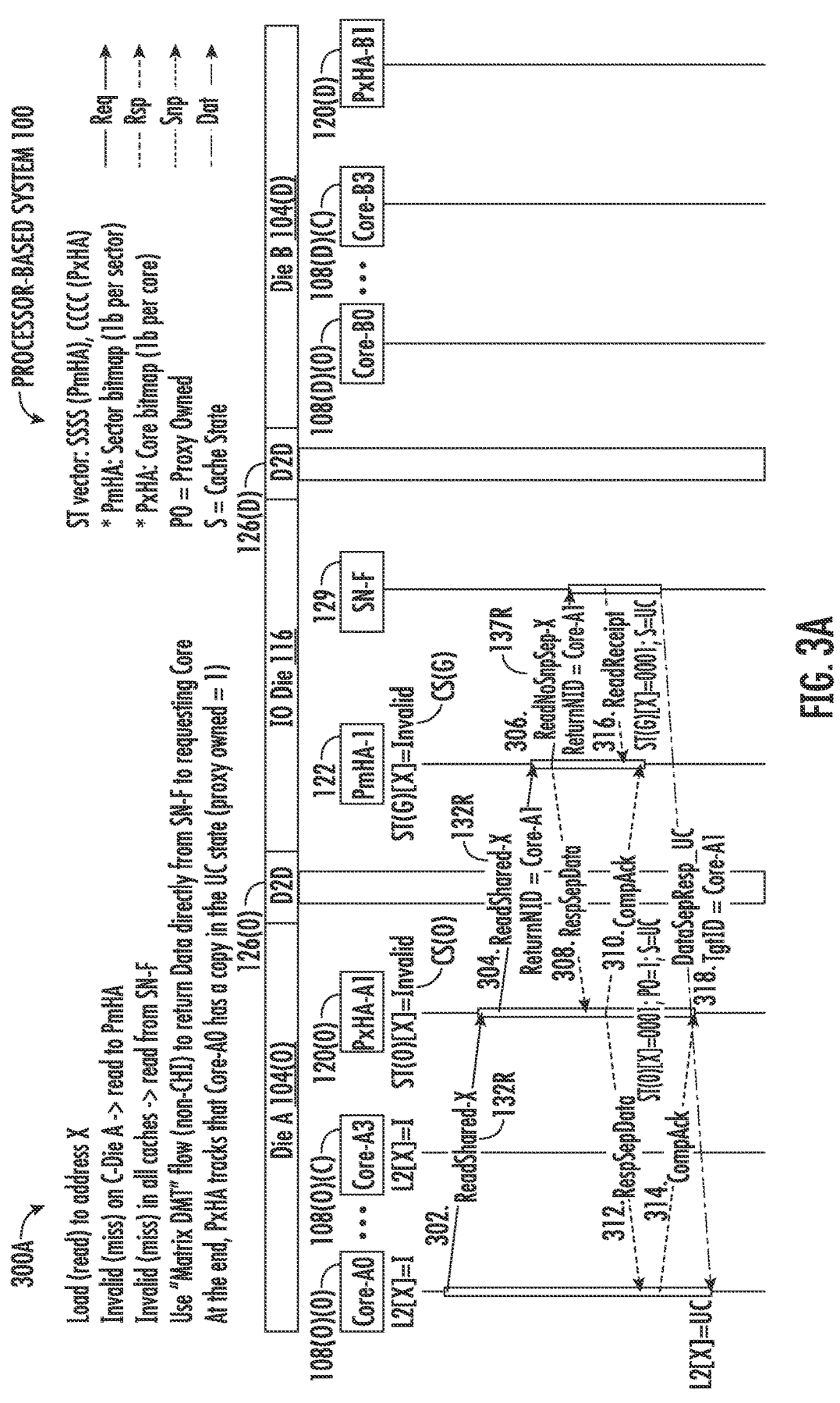
FIG. 3A is an exemplary process of performing a memory read request in the multiple-level hierarchy cache system in FIG. 1 that results in a cache miss to the local cache memory in the die of the requestor, and involves communication between the proxy cache controller circuit in the die to the global cache controller circuit to retrieve the requested valid cache line from a system memory.
Figure 3B:
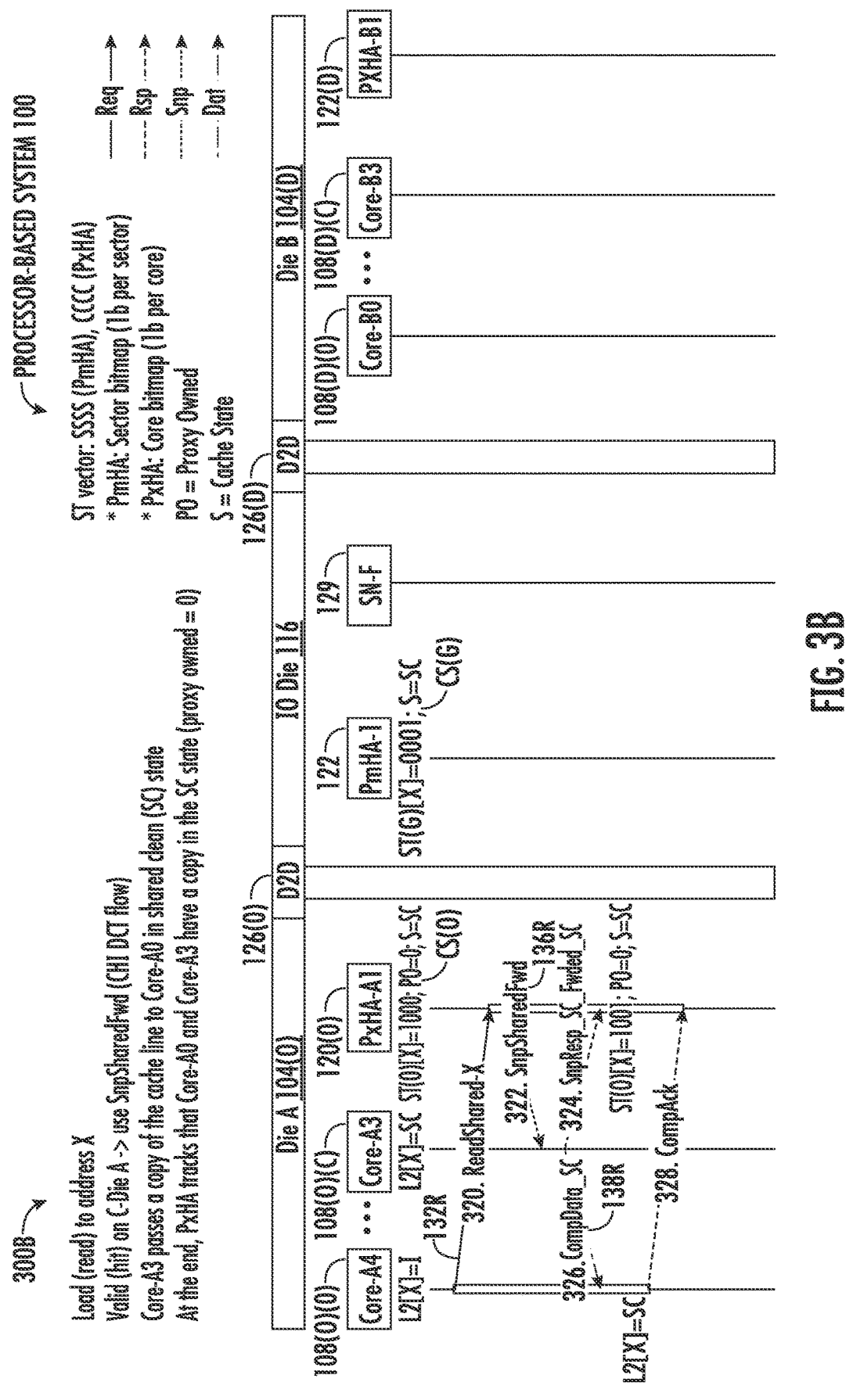
FIG. 3B is an exemplary process of performing a memory read request in the multiple-level hierarchy cache system in FIG. 1 that results in a cache hit to the local cache memory in the same die as the requesting central processing unit (CPU) core.
Figure 3C:
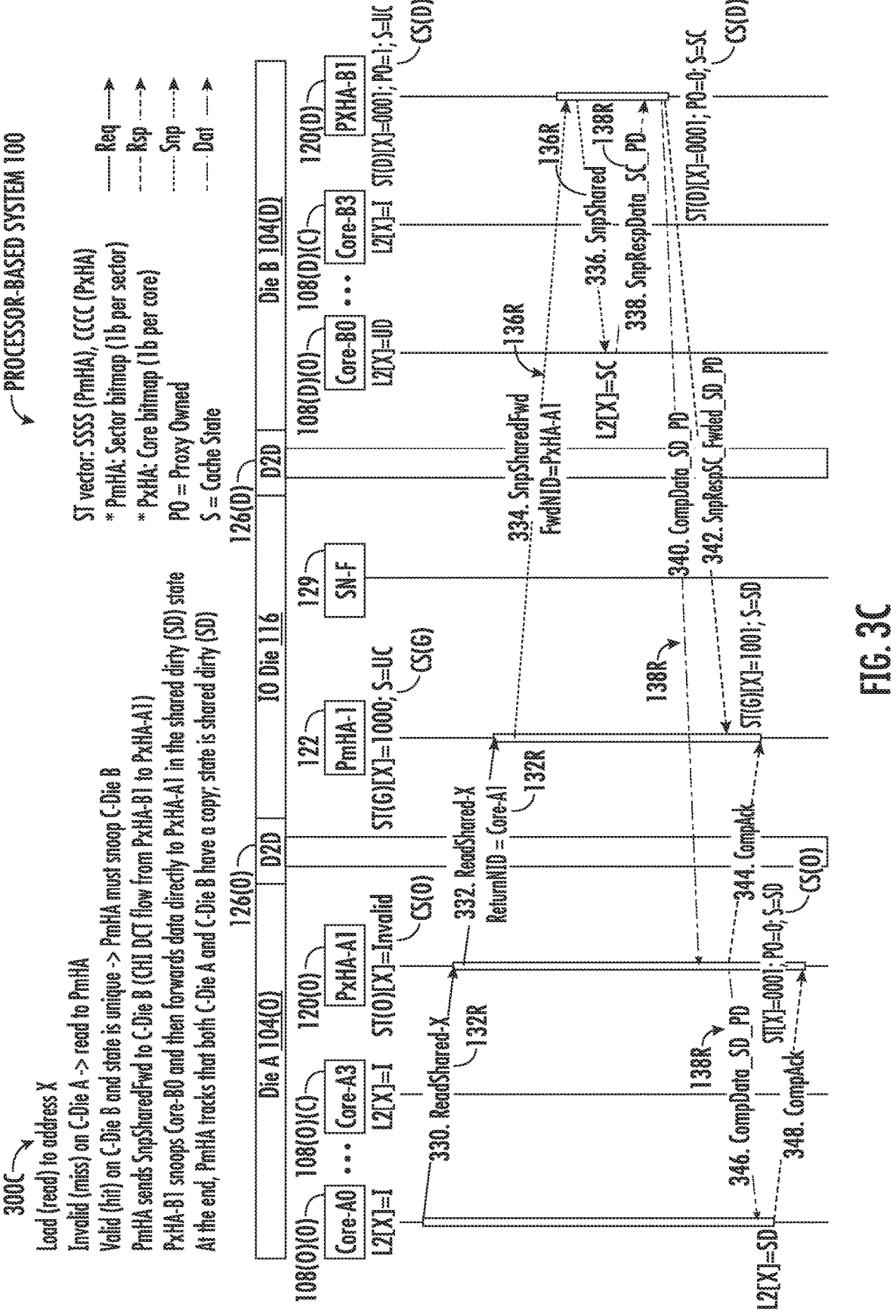
Figure 4A:
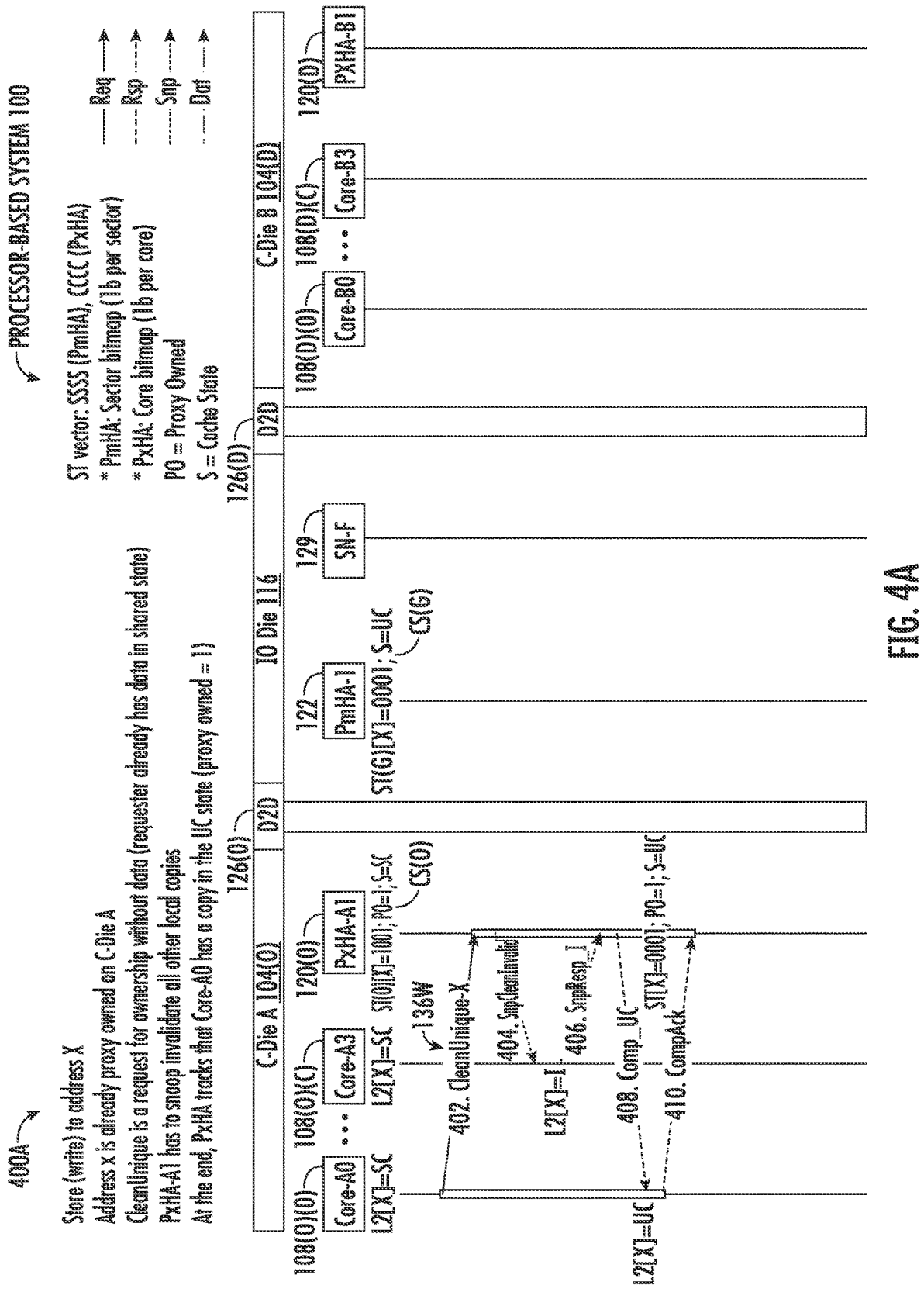
Figure 4B:
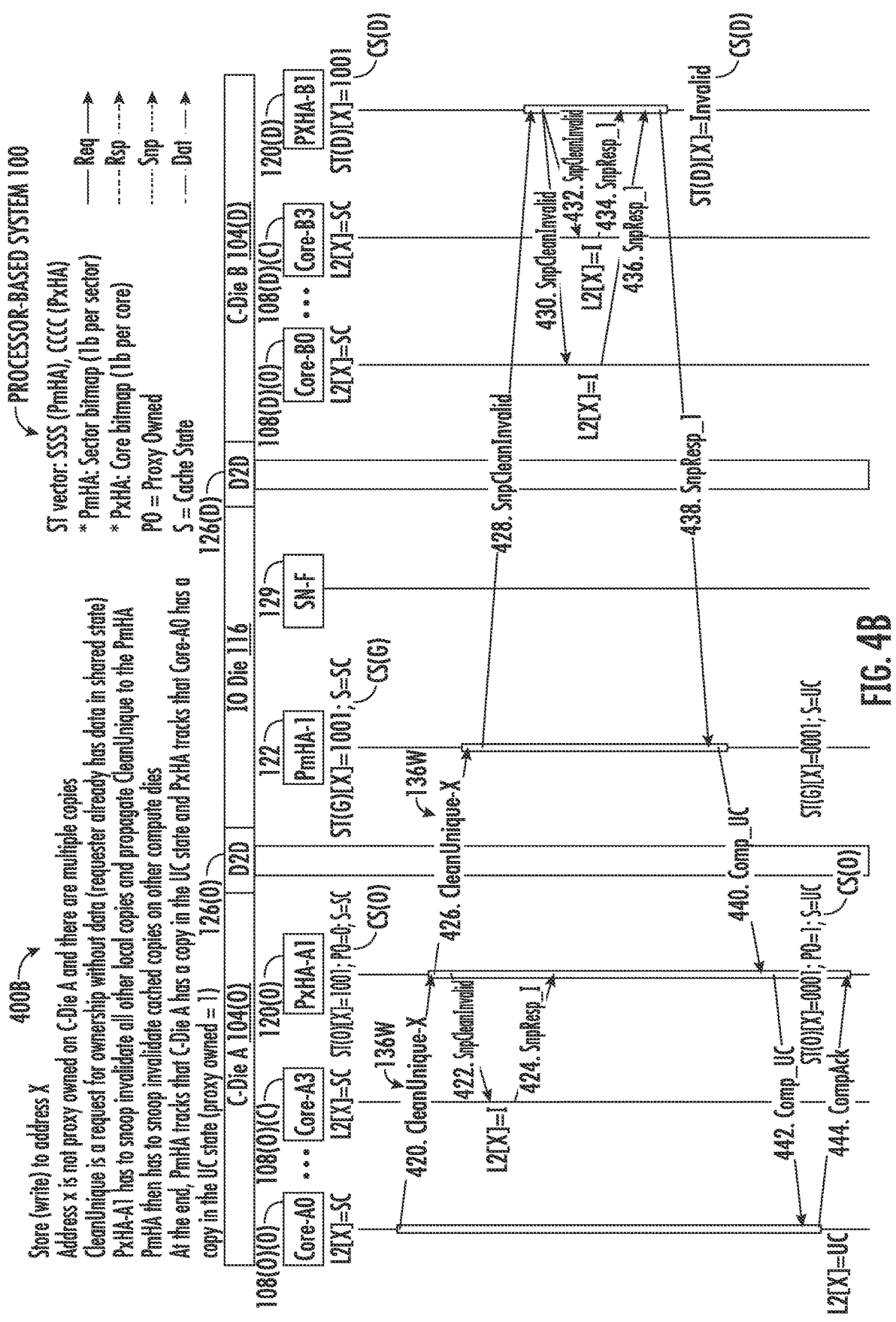
Figure 4C:
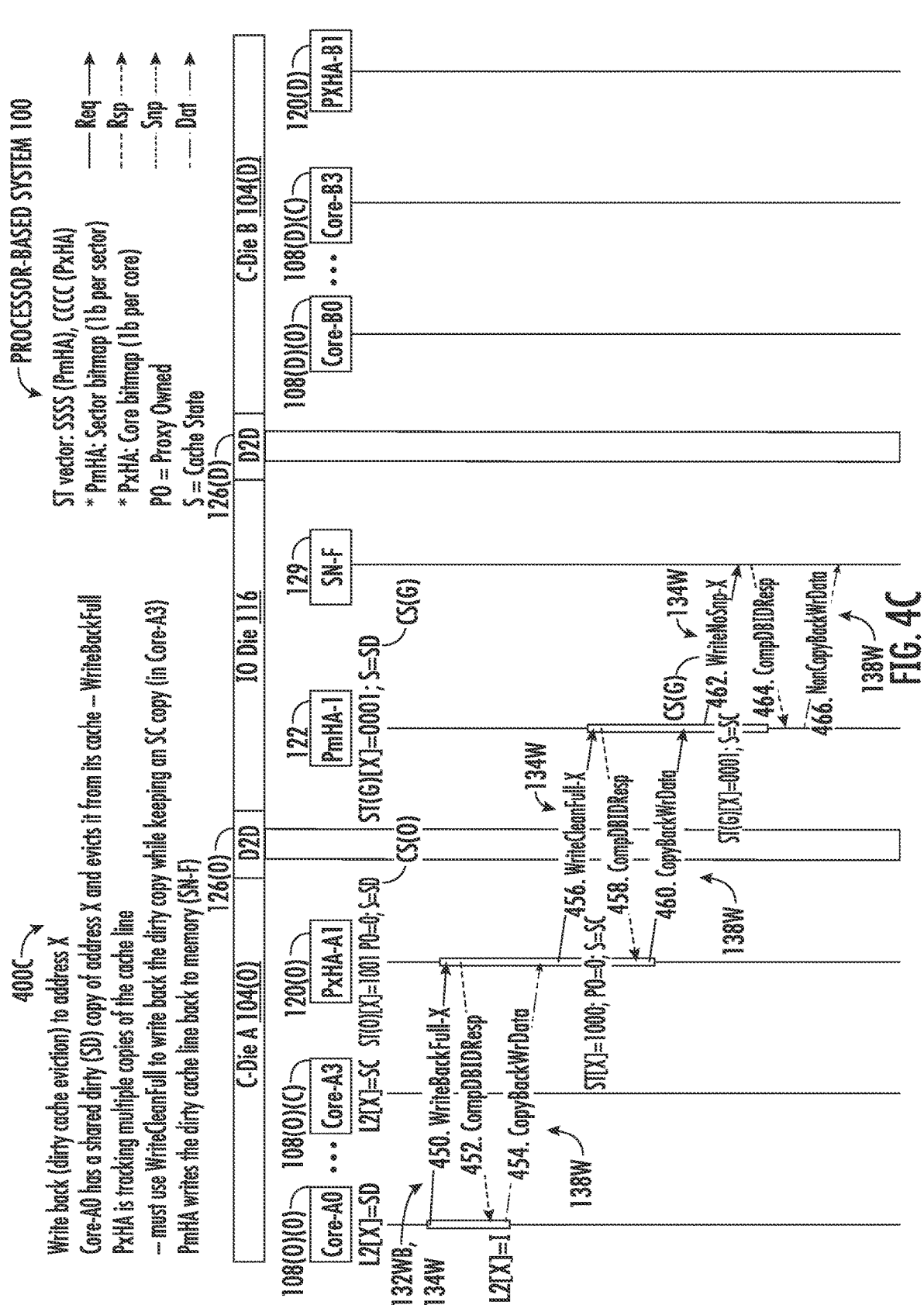
Figure 5A:
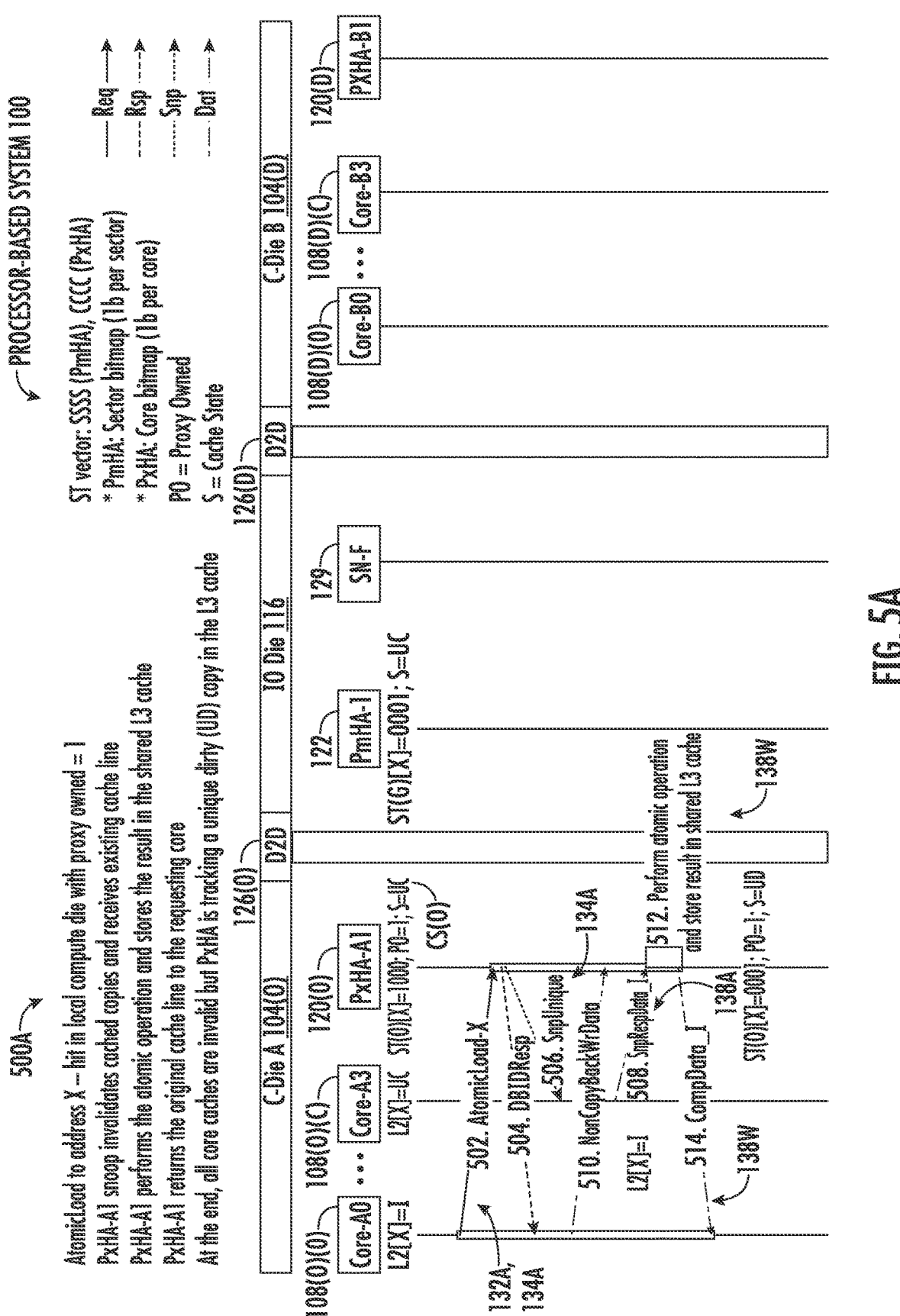
Figure 5B:
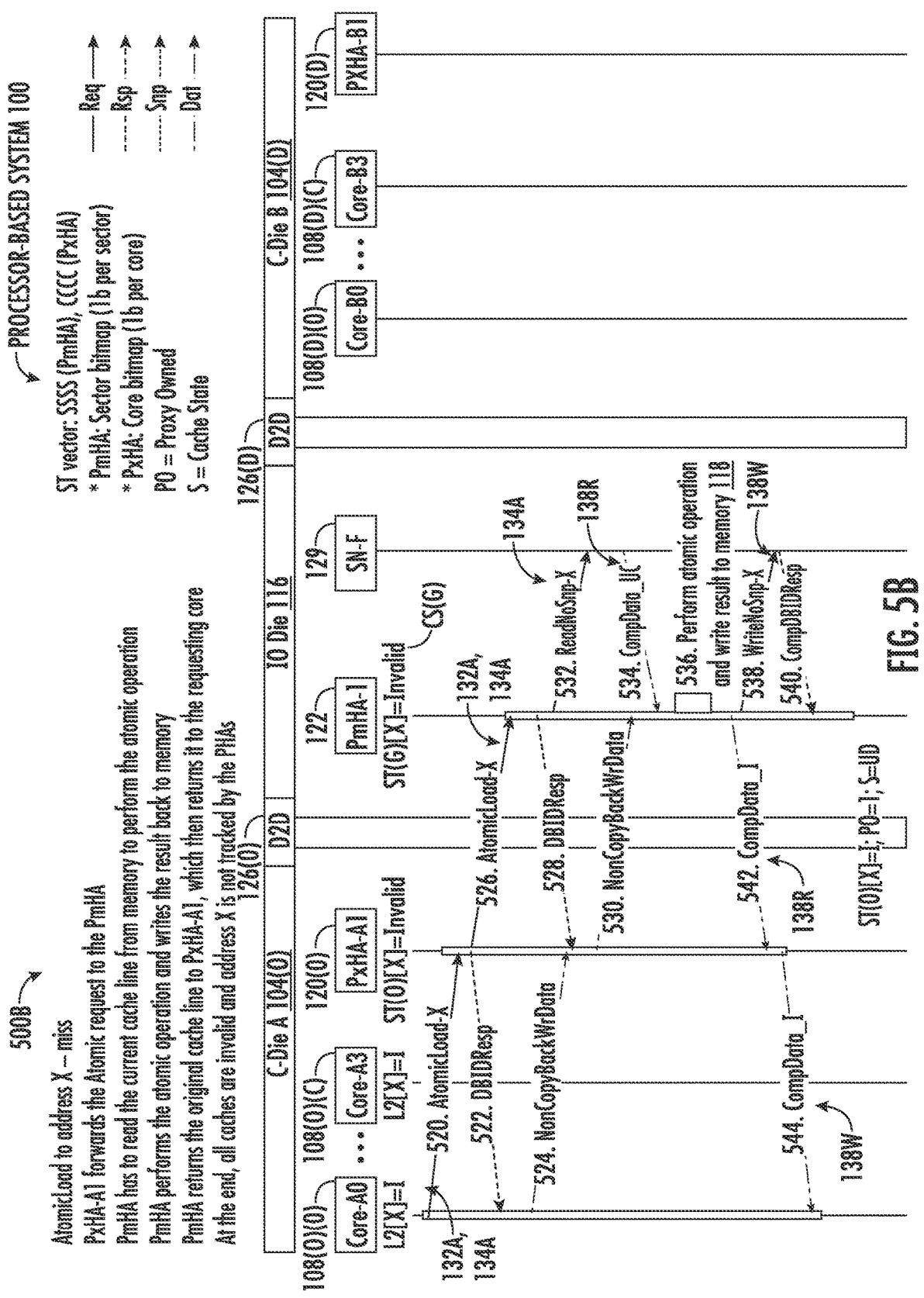
Figure 6:
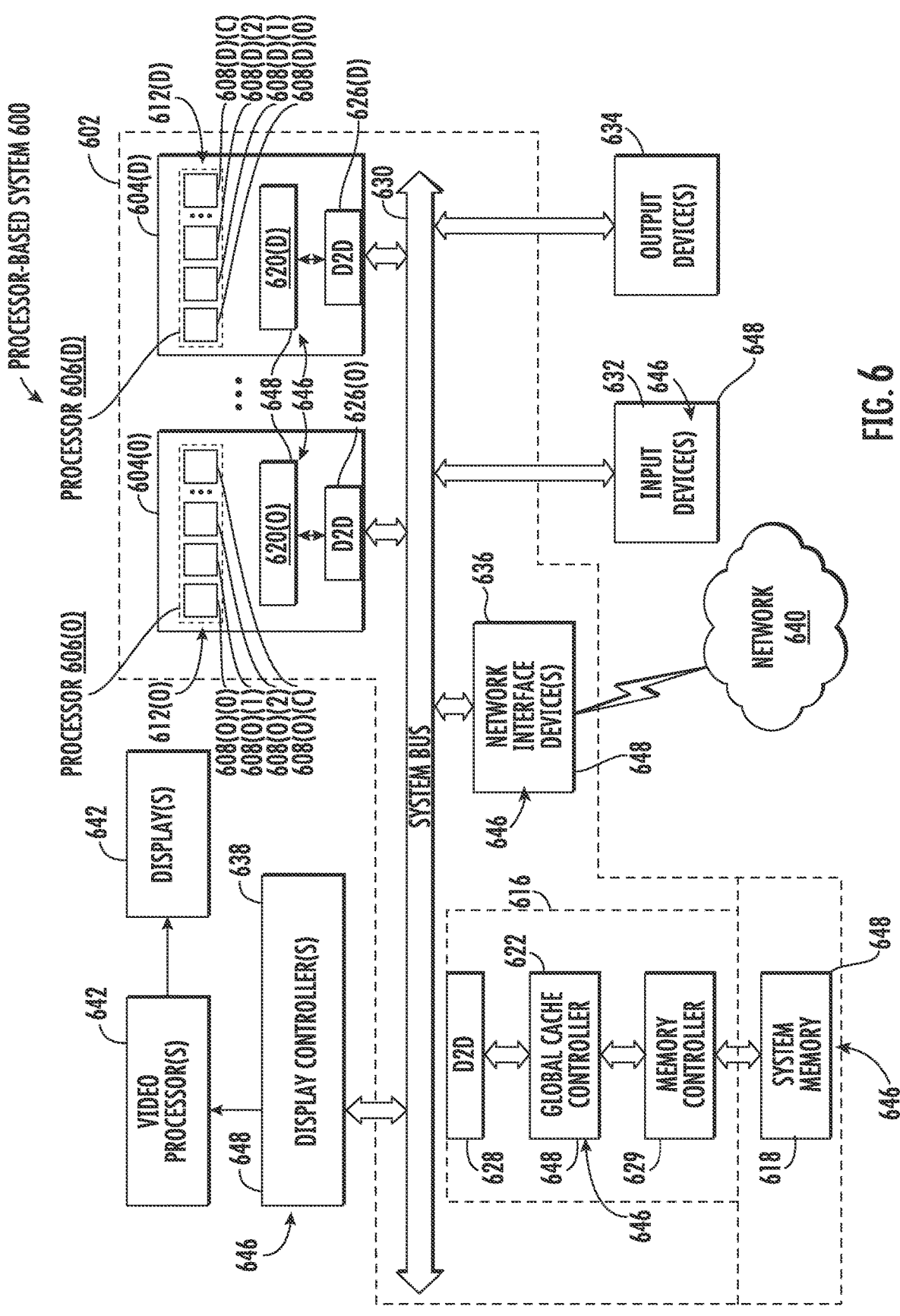

FIG. 3C is an exemplary process of performing a memory read request in the multiple-level hierarchy cache system in FIG. 1 that results in a cache miss to the local cache memory in the die of the requesting CPU core, and involves communication between the proxy cache controller circuit in the die to the global cache controller circuit to retrieve the requested valid cache line from a local cache memory in another die;

FIG. 4A is an exemplary process of performing a memory write request in the multiple-level hierarchy cache system in FIG. 1 that results in a cache hit that is proxy owned in the local cache memory in the same die as the requesting CPU core;

FIG. 4B is an exemplary process of performing a memory write request in the multiple-level hierarchy cache system in FIG. 1 that results in a cache miss in the local cache memory in the die of the requesting CPU core;

FIG. 4C is an exemplary process of performing a memory write back (i.e., store) request in the multiple-level hierarchy cache system in FIG. 1 as a result of a local cache memory eviction that involves communication between the proxy cache controller circuit in the die and the global cache controller circuit;

FIG. 5A is an exemplary process of performing a memory atomic request that involves access through the proxy cache controller circuit to a local cache memory in the same die;

FIG. 5B is an exemplary process of performing a memory atomic request that involves access through the global cache controller circuit to a local cache memory in another die; and FIG. 6 is a block diagram of another exemplary computer system that includes a processor-based system that includes a plurality of dies each having a processor, a local cache memory as part of a global cache memory of a multiple-level hierarchy cache coherency system, and a proxy cache controller circuit, wherein each proxy cache controller circuit is capable of locally servicing memory requests solely within its die, when possible to maintain cache coherency, to provide lower-latency memory transactions, and wherein the processor-based system further includes a global cache controller circuit configured to communicate with the proxy cache controller circuits to maintain a single point of cache coherency in the global cache memory.

DETAILED DESCRIPTION

Aspects disclosed herein include cache memory systems employing a multiple-level hierarchy cache coherency architecture particularly suited, but not limited to, a multi-die processor-based system. Related methods and computer-readable media are also disclosed. In exemplary aspects, the processor-based system includes a plurality of separate dies (e.g., compute dies on multiple sockets) that each have a processor (e.g., with multiple central processing unit (CPU) cores) configured to execute instructions to perform tasks. Each die includes a local cache memory as part of the cache memory system for storing cached data to service memory access requests from the processor (e.g., its CPU cores) on its die, when possible. In this manner, lower latency memory transactions are supported within each die if a memory access request can be serviced by solely managing the memory transaction through the local cache memory on its die. However, it is desired that the local cache memories distributed over the plurality of dies logically form one global cache memory and a cache coherency protocol can be implemented for maintaining cache coherency. Forming a global cache memory logically from the local cache memories distributed over the plurality of dies may also support a larger-sized global cache memory for the processor-based system.

In this regard, to provide a single point of cache coherency for the processor-based system while providing a global cache memory that logically includes local cache memories distributed over the plurality of dies, the processor-based system includes a plurality of proxy cache controller circuits on each die, and a global cache controller circuit. The proxy cache controller circuits are each configured to service memory access requests over the entire system address space of the processor-based system from the processors on its die. The global cache controller circuit is configured to communicate with each of the proxy cache controller circuits to maintain cache coherency over the global cache memory logically formed from the distributed local cache memories. The global cache controller circuit may be contained on a separate die from the dies or contained within a die of the plurality of dies. Thus, if a memory access request can be fully serviced within a given die and still maintain cache coherency of the global cache memory (e.g., a read request that validly hits to a cache line in a local cache memory, or accessed after unique ownership of the cache line is obtained), the proxy cache controller circuit can autonomously service the memory access request from the local cache memory contained within its die, when possible to maintain cache coherency, without the need for communication to the global cache controller circuit to support a lower-latency memory transaction. However, if a memory access request cannot be serviced within a given die (e.g., a write request to a cache line that is not uniquely owned by a local cache memory), the proxy cache controller circuit is configured to communicate with the global cache controller circuit. The global cache controller circuit is configured to communicate with the other proxy cache controller circuit(s) in a hierarchical fashion, as needed, that manage access to their respective local cache memory as part of the global cache memory, to maintain cache coherency of the global cache memory.

In this manner, as an example, a cache coherency protocol that is based on a single point of cache coherency can be implemented in the multi-die processor-based system through the global cache controller circuit, but the proxy cache controller circuits in each die are still capable of servicing memory access requests contained within its die, when possible, for lower-latency memory transactions. In other words, because the proxy cache controller circuits are capable of servicing memory access requests solely within its die that can be so done and still maintain cache coherency of the global cache memory, there is not a need to configure the proxy cache controller circuits to always communicate memory access requests through the global cache controller circuit to maintain cache coherency of the global cache memory. Communication to the global cache controller circuit for a memory transaction comes with a cost of additional latency for the memory transaction.

In this regard, FIG. 1 is a block diagram of an exemplary multi-die processor-based system 100 ("processor-based system 100") that includes a multiple (multi)-level hierarchy cache system 102. As discussed in more detail below, the multi-level hierarchy cache system 102 is configured to maintain cache coherency of cache memory distributed among a plurality of dies 104(0)-104(D) that each have a respective first processor 106(0)-106(D). In this example, the dies 104(0)-104(D) are also referred to as "compute" dies 104(0)-104(D). A "compute die" is any die that includes processing circuitry, such as a processor and/or CPU cores for executing instructions to perform computer related tasks, such as CPU, graphics processing unit (GPU) tasks, and the like. In this example, the processor-based system 100 is a multi-socket processor-based system that includes the multiple processors 106(0)-106(D) that are distributed among respective separate compute dies 104(0)-104(D). Die 104(0) is shown in FIG. 1 as "Compute Die A," and die 104(D) is shown in FIG. 1 as "Compute Die B." Multi-socket processor-based systems offer several advantages, including increased processing power, scalability in that additional sockets can be added, and the ability to support increased memory capacity with a single address space with memory circuits being able to be shared in a shared address space, but distributed among the multiple compute dies 104(0)-104(D) and/or other dies. Each processor 106(0)-106(D) includes a respective plurality of central processor unit (CPU) cores

108(0)(0)-108(0)(C)-108(D)(0)-108(D)(C) that are each configured to execute instructions to perform compute related tasks in its respective compute die 104(0)-104(D). Note that two (2) compute dies 104(0), 104(D) are shown each having a respective processor 106(0), 106(D), but the processor-based system 100 is shown as having a total of 'D'+1 number of compute dies 104(0)-104(D) and respective processors 106(0)-106(D), where 'D' can be any whole positive number. Also, the four (4) CPU cores 108(0)(0)-108(0)(C)-108(D)(0)-108(D)(C) are shown as being included in reach respective processor 106(0)-106(D), but note each processor 106(0)-106(D) is shown as having a total of 'C+1' CPU cores, where 'C' can be any whole positive number.

As further shown in FIG. 1, the multi-level hierarchy cache system 102 in the processor-based system 100 forms a global cache memory 110 that includes respective local cache memories 112(0)-112(D) provided on each compute die 104(0)-104(D). In this example, the local cache memories 112(0)-112(D) each include multiple cache memories 114(0)(0)-114(0)(C)-114(D)(0)-114(D)(C) associated with or assigned to (e.g., included in) one or more of the CPU cores 108(0)(0)-108(0)(C)-108(D)(0)-108(D)(C) in the respective processors 106(0)-106(D). In this manner, the cache memories 114(0)(0)-114(0)(C)-114(D)(0)-114(D)(C) are accessible locally by the respective CPU cores 108(0)(0)-108(0)(C)-108(D)(0)-108(D)(C) for servicing a memory access request. However, if a cache miss occurs for a memory access request by a given CPU core 108(0)(0)-108(0)(C)-108(D)(0)-108(D)(C) to its respective cache memory 114(0)(0)-114(0)(C)-114(D)(0)-114(D)(C), another cache memory 114(0)(0)-114(0)(C)-114(D)(0)-114(D)(C) in the respective CPU cores 108(0)(0)-108(0)(C)-108(D)(0)-108(D)(C) can then be accessed as a next level cache memory. If a cache miss by a given CPU core 108(0)(0)-108(0)(C)-108(D)(0)-108(D)(C) then occurs in the cache memory 114(0)(0)-114(0)(C)-114(D)(0)-114(D)(C) associated with a different CPU core 108(0)(0)-108(0)(C)-108(D)(0)-108(D)(C) in its processors 106(0)-106(D), the memory access request can be communicated off-die to an input/output (I/O) die 116 that may contain the requested cached data and/or to a local cache memory 112(0)-112(D) of another respective processor 106(0)-106(D) on a respective compute die 104(0)-104(D). Note that the dies 104(0)-104(D) could also contain other cache memory that is at different, higher cache level with regard to the local cache memories 112(0)-112(D) and that can be accessed by the respective proxy cache controller circuit 120(0)-120(D) to service cache requests. There is nothing that limits the disclosure herein to local cache memories being contained with the respective CPU cores 108(0)(0)-108(D)(C).

In this manner, if a local cache memory 112(0)-112(D) can service a memory access request, such can be performed without such request having to be made off-die for reduced memory access latency. However, if a local cache memory 112(0)-112(D) cannot service a memory access request, an off-die request can still be made to try to service the memory access request from another local cache memory 112(0)-112(D) and/or from a system memory 118. Thus, the global cache memory 110 with its distributed local cache memories 112(0)-112(D) provides for a single addressable memory system for reduced complexity in memory addressing in a memory system for the processor-based system 100, while the local cache memories 112(0)-112(D) are distributed among the multiple compute dies 104(0)-104(D) for increased processing power and scalability. Forming the global cache memory 110 logically from the local cache memories 112(0)-112(D) distributed over the multiple compute dies 104(0)-104(D may also support a larger-sized global cache memory 110 for the processor-based system 100. However, with the logical global cache memory 110 formed by the local cache memories 112(0)-112(D) being addressable for the full system memory address space of the processor-based system 100, cache coherency of the global cache memory 110 and its local cache memories 112(0)-112(D) must also be maintained for cache system integrity.

In this regard, to provide a single point of cache coherency for the multi-level hierarchy cache system 102 while providing the global cache memory 110 that logically includes the local cache memories 112(0)-112(D) distributed over the compute dies 104(0)-104(D), the processor-based system 100 in this example includes proxy cache controller circuits 120(0)-120(D) on each respective compute die 104(0)-104(D), and a global cache controller circuit 122 coupled to the respective CPU cores 108(0)(0)-108(0)(C)-108(D)(0)-108(D)(C) on the respective compute dies 104(0)-104(D). In this example, the global cache controller circuit 122 is located on a separate I/O die 116, but could also be located on any of the compute dies 104(0)-104(D) as another example. As discussed in more detail below, the proxy cache controller circuits 120(0)-120(D) are each configured to service memory access requests over the entire system address space of the processor-based system 100 to the local cache memory 112(0)-112(D) on its respective compute die 104(0)-104(D). In this manner, if a cache miss occurs for a given memory access request by a CPU core 108(0)(0)-108(0)(C)-108(D)(0)-108(D)(C) to its respective cache memory 114(0)(0)-114(0)(C)-114(D)(0)-114(D)(C), the memory access request can be communicated to the proxy cache controller circuit 120(0)-120(D) on its respective compute die 104(0)-104(D), which in turn can determine if the memory access request can be serviced by another cache memory 114(0)(0)-114(0)(C)-114(D)(0)-114(D)(C) in its respective local cache memory 112(0)-112(D) on its same respective compute die 104(0)-104(D). Each compute die 104(0)-104(D) includes a respective on-die network circuit 124(0)-124(D) that is used to communicate requests between the CPU core 108(0)(0)-108(0)(C)-108(D)(0)-108(D)(C) on its compute die 104(0)-104(D) and the respective proxy cache controller circuit 120(0)-120(D) and other CPU cores 108(0)(0)-108(0)(C)-108(D)(0)-108(D)(C) on its compute die 104(0)-104(D). In this manner, the proxy cache controller circuits 120(0)-120(D) on each respective compute die 104(0)-104(D) can service memory access requests among its respective local cache memory 112(0)-112(D) and also maintain cache coherency of its respective local cache memory 112(0)-112(D).

With continuing reference to FIG. 1, and as discussed above, if a cache miss occurs as a result of a proxy cache controller circuit 120(0)-120(D) not being able to service a memory access request to the local cache memory 112(0)-112(D) on its respective compute die 104(0)-104(D), the proxy cache controller circuit 120(0)-120(D) forwards this request off-die to the global cache controller circuit 122. In this regard, each compute die 104(0)-104(D) includes a respective die-to-die (D2D) interface circuit 126(0)-126(D) that is coupled to the on-die network circuit 124(0)-124(D) of its respective compute die 104(0)-104(D). The proxy cache controller circuit 120(0)-120(D) is configured to communicate memory access requests to the global cache controller circuit 122 through communications through its on-die network circuit 124(0)-124(D) to the D2D interface circuit 126(0)-126(D) on its respective compute die 104(0)-104(D) and to the global cache controller circuit 122 through a respective D2D interface circuit 128(0)-128(D) on the I/O die 116 that includes the global cache controller circuit 122. The I/O die 116 includes an on-die network circuit 130 to provide an interface between the D2D interface circuits 128(0)-128(D) and the global cache controller circuit 122. The global cache controller circuit 122 is configured to be able to communicate memory access requests to the system memory 118 through a memory controller 129 and respective memory interface circuit 131 coupled to the system memory 118 to service memory access requests to the system memory 118 in the event of a complete cache miss to all local cache memories 112(0)-112(D) in the global cache memory 110 and/or for memory write backs as examples. The global cache controller circuit 122 is also configured to communicate with each of the proxy cache controller circuits 120(0)-120(D) to maintain cache coherency over the global cache memory 110 logically formed from the distributed local cache memories 112(0)-112(D).

Thus, if a memory access request can be fully serviced within a given compute die 104(0)-104(D) and its respective proxy cache controller circuit 120(0)-120(D) still maintains cache coherency of the global cache memory 110, the proxy cache controller circuit 120(0)-120(D) can autonomously service the memory access request from its respective local cache memory 112(0)-112(D), and without the need for off-die communication (in this example) to the global cache controller circuit 122 to support a lower-latency memory transaction. An example of this is a read request that validly hits to a cache line in a given local cache memory 112(0)-112(D), or is accessed after unique ownership of the cache line is obtained. However, if a memory access request cannot be serviced within a given compute die 104(0)-104(D) and its respective proxy cache controller circuit 120(0)-120(D) cannot otherwise maintain cache coherency of the global cache memory 110, the proxy cache controller circuit 120(0)-120(D) is configured to communicate with the global cache controller circuit 122. An example of this is a write request to a cache line that is not uniquely owned by an accessed local cache memory 112(0)-112(D). The global cache controller circuit 122 is configured to communicate with the other proxy cache controller circuits 120(0)-120(D) on the other compute dies 104(0)-104(D) in a hierarchical fashion, as needed, that manage access to their respective local cache memories 112(0)-112(D) as part of the global cache memory 110, to maintain cache coherency of the global cache memory 110.

In this manner, as an example, a cache coherency protocol that is based on a single point of cache coherency can be implemented in the multi-die processor-based system 100 through the global cache controller circuit 122, while the proxy cache controller circuits 120(0)-120(D) in the respective compute dies 104(0)-104(D) are still capable of servicing memory access requests contained within the local cache memory 112(0)-112(D) of its compute die 104(0)-104(D), when possible, for lower-latency memory transactions. In other words, because the proxy cache controller circuits 120(0)-120(D) are capable of servicing memory access requests solely within its compute die 104(0)-104(D) and still maintain cache coherency of the global cache memory 110, there is not a need to configure the proxy cache controller circuits 120(0)-120(D) to always communicate memory access requests to the off-die global cache controller circuit 122 to maintain cache coherency of the global cache memory 110. Communication to the global cache controller circuit 122 for a memory transaction comes with a cost of additional latency for the memory transaction.

FIG. 2A is a flowchart illustrating an exemplary process 200 of a proxy cache controller circuit 120(0)-120(D) performing a memory access request 132 in the multiple-level hierarchy cache system 102 in the processor-based system 100 in FIG. 1. In the example process 200 in FIG. 2A, the process 200 could be a memory read request for performing a memory read request process 200R. As discussed above, the proxy cache controller circuit 120(0)-120(D) can perform a memory access request in response to a cache miss from a memory access by a CPU core 108(0)(0)-108(0)(C)-108(D)(0)-108(D)(C) to its assigned cache memory 114(0)(0)-114(0)(C)-114(D)(0)-114(D)(C), so as to maintain cache coherency in the respective local cache memory 112(0)-112(D) in its compute die 104(0)-104(D). If the proxy cache controller circuit 120(0)-120(D) is not able to perform the memory access request 132 in response to a cache miss in its respective compute die 104(0)-104(D), the proxy cache controller circuit 120(0)-120(D) is configured to communicate the memory access request 132 to the global cache controller circuit 122 to be serviced by another proxy cache controller circuit 120(0)-120(D) in another respective compute die 104(0)-104(D) so as to maintain cache coherency in the global cache memory 110. The memory access request 132 can be serviced by the system memory 118 if the memory access request 132 cannot be serviced by another proxy cache controller circuit 120(0)-120(D) in another respective compute die 104(0)-104(D).

In this regard, as shown in FIG. 2A, using the proxy cache controller circuit 120(0) in compute die 104(0) as an example, but applicable to any proxy cache controller circuit 120(0)-120(D), the proxy cache controller circuit 120(0) receives a memory access request 132 (e.g., a memory read request 132R) comprising a memory address 134 (e.g., a memory read address 134R) from a first CPU core 108 of the plurality of CPU cores 108(0)(0)-108(0)(C)-108(D)(0)-108(D)(C) (block 202 in FIG. 2A). The proxy cache controller circuit 120(0) receives the memory access request 132 (e.g., the memory read request 132R) in response to the first CPU core 108 not being able to service the memory access request 132 in a first cache memory 114 of the plurality of cache memories 114(0)(0)-114(0)(C)-114(D)(0)-114(D)(C) assigned to the first CPU core 108 (block 202 in FIG. 2A). The process 200, 200R also includes the proxy cache controller circuit 120(0) determining if the memory access request 132 (e.g., the memory read request 132R) is able to be serviced (e.g., a cache hit) in any other cache memories 114 of the plurality of cache memories 114(0)(0)-114(0)(C)-114(D)(0)-114(D)(C) assigned to the other CPU cores 108 of the plurality of CPU cores 108(0)(0)-108(0)(C)-108(D)(0)-108(D)(C) (block 204 in FIG. 2A). In response to determining the memory access request 132 (e.g., the memory read request 132R) is not able to be serviced (e.g., is a cache miss) in any of the other cache memories 114(0)(0)-114(0)(C)-114(D)(0)-114(D)(C) (block 206 in FIG. 2A), the proxy cache controller circuit 120(0) can either directly communicate or cause the memory access request 132 (e.g., read access request 137R to be communicated to the global cache controller circuit 122 on the second (I/O) die 116 (block 208 in FIG. 2A).

There may also be other information communicated or included in the memory access snoop request 136 communicated from the proxy cache controller circuit 120(0) to the global cache controller circuit 122, such as to identify the proxy cache controller circuit 120(0). In this manner, the global cache controller circuit 122 knows from which proxy cache controller circuit 120(0)-120(D) a request was received and in turn which proxy cache controller circuit 120(0)-120(D) to respond to in response to a received request. For example, in the context of a memory read request 132R, if a proxy cache controller circuit 120(0)-120 (D) makes a memory access snoop request 136 to the global cache controller circuit 122 for read data 136R, the identification of the proxy cache controller circuit 120(0)-120(D) is used by the global cache controller 122 to know which proxy cache controller circuit 120(0)-120(D) to return the read data 136R.

As discussed in more detail below, the global cache controller circuit 122 can service the memory access request 132 (e.g., the memory read request 132R) from another local cache memory 112(1)-112(D) in another compute die 104 (0)-104(D) or the system memory 118 if not able to be serviced by another cache memory 114(0)(1)-114(D)(C). The proxy cache controller circuit 120(0) is configured to update a cache state for the memory address associated with the memory access request 132 (e.g., the memory read request 132R) indicating that the cache memory 114(0) on the compute die 104(0) of the proxy cache controller circuit 120(0) has a copy of data 138 (e.g., read data 138R) for the memory access request 132 (e.g., memory read request 132R) (block 210 in FIG. 2A).

FIG. 2B is a flowchart illustrating an exemplary memory write request process 200W of a proxy cache controller circuit 120(0)-120(D) performing a memory write request 132W to obtain unique ownership for a memory write address 134W to be written in the multiple-level hierarchy cache system 102 in the processor-based system 100 in FIG. 1. This memory write request process 200W can be performed when the respective proxy cache controller circuit 120(0)-120(D) does not have unique ownership of the memory write address 134W in its respective local cache memory 112(0)-112(D). As discussed above, the proxy cache controller circuit 120(0)-120(D) can perform a memory write request in response to a memory write access by a CPU core 108(0)(0)-108(0)(C)-108(D)(0)-108(D)(C) not having access unique ownership of the memory write address 134W its assigned cache memory 114(0)(0)-114(0) (C)-114(D)(0)-114(D)(C), so as to maintain cache coherency in the respective local cache memory 112(0)-112(D) in its compute die 104(0)-104(D). If the proxy cache controller circuit 120(0)-120(D) is not able to perform the memory write request 132W with a unique ownership cache state of the memory write address 134W within the local cache memory 112(0)-112(D) on its compute die 104(0)-104(D), the proxy cache controller circuit 120(0)-120(D) is configured to communicate a unique snoop request for the memory write request 132W to request a unique cache state for the memory write address 134W to be written to the global cache controller circuit 122 to obtain a unique ownership cache state for the memory write address 134W from another proxy cache controller circuit 120(0)-120(D) in another respective compute die 104(0)-104(D) or system memory 118 so as to maintain cache coherency in the global cache memory 110.

In this regard, as shown in FIG. 2B, using the proxy cache controller circuit 120(0) in the compute die 104(0) as an example, but applicable to any proxy cache controller circuit 120(0)-120(D), the proxy cache controller circuit 120(0) receives a memory write request 132W comprising a unique ownership request 140 for a memory write request 132W comprising a memory write address 134W from the first CPU core 108 of the plurality of CPU cores 108(0)(0)-108 (0)(C)-108(D)(0)-108(D)(C) (block 220 in FIG. 2B). The proxy cache controller circuit 120(0) can receive the memory write request 132W in response to a cache line for the memory write address 134W in the cache memory 114(0)(0)-114(0)(C) corresponding to the memory write request 132W being in a shared state or not being present in the first cache memory 114. The proxy cache controller circuit 120(0) determines if write data 138W for the memory write request 132W is in a shared state in the other cache memories 114 of the plurality of cache memories 114(0)(0)-114(0)(C)-114(D)(0)-114(D)(C) assigned to the other CPU cores 108 of the plurality of CPU cores 108(0)(0)-108(0) (C)-108(D)(0)-108(D)(C) (block 222 in FIG. 2B).

In response to determining the write data 138W for the memory write request 132W is in a shared state in one or more other cache memories 114 of the plurality of cache memories 114(0)(0)-114(0)(C)-114(D)(0)-114(D)(C) (block 224 in FIG. 2B), the proxy cache controller circuit 120(0) issues a snoop invalidate 142 to the one or more other cache memories 114(0)(0)-114(0)(C)-114(D)(0)-114(D)(C) to invalidate the write data 138W corresponding to the memory write address 134W of the memory write request 132W in the one or more other cache memories 114(0)(0)-114(0)(C)-114(D)(0)-114(D)(C) (block 226 in FIG. 2B). The proxy cache controller circuit 120(0) then communicates a unique ownership state for the memory write address 134W of the memory write request 132W to the first CPU core 108 (block 228 in FIG. 2B). The first CPU core 108 then writes the write data 138W for the memory write request 132W to the first cache memory 114 in response to receiving the unique ownership state for the memory write address 134W of the memory write request 132W (block 230 in FIG. 2B).

As discussed in more detail below, if in block 226 in FIG. 2B, the write data 138W for the memory write request 132W is determined to not be in a shared state in one or more other cache memories 114(0)(0)-114(0)(C)-114(D)(0)-114(D)(C) (block 224 in FIG. 2B), the proxy cache controller circuit 120(0) communicates the memory write request 132W to the global cache controller circuit 122 so it can obtain a unique ownership cache state for the memory write address 134W from the other local cache memories 112(1)-112(D) in the other compute dies 104(1)-104(D) to maintain cache coherency.

FIG. 2C is a flowchart illustrating an exemplary process 200A of a proxy cache controller circuit 120(0)-120(D) in the multiple-level hierarchy cache system 102 in FIG. 1 performing a memory atomic request 132A while maintaining cache coherency in its compute die 104(0)-104(D). The proxy cache controller circuit 120(0)-120(D) is configured to communicate the memory atomic request 132A not able to be serviced in its compute die 104(0)-104(D) to the global cache controller circuit 122 to maintain cache coherency in the global cache memory 110.

In this regard, as illustrated in FIG. 2C, using the proxy cache controller circuit 120(0) in the compute die 104(0) as an example, but applicable to any proxy cache controller circuit 120(0)-120(D), the process 200A includes the proxy cache controller circuit 120(0) receiving a memory atomic request 132A. The memory atomic request 132A comprises a memory write address 134A and an atomic operation 144 from a CPU core 108 on its compute die 104(0). The proxy cache controller circuit 120(0) receives the memory atomic request 132A in response to a cache line in the cache memory 114 assigned to the CPU core 108 corresponding to the memory atomic request 132A being in an invalid state I (block 240 in FIG. 2C). The proxy cache controller circuit 120(0) determines if the memory atomic request 132A is a cache hit in another cache memory 114(0)(0)-114(0)(C)-114 (D)(0)-114(D)(C) in the compute dies 104(0)-104(D) (block 242 in FIG. 2C). For example, the proxy cache controller circuit 120(0) can first determine if the memory atomic request 132A is a cache hit in another cache memory 114(0)(0)-114(0)(C) in the same compute die 104(0). If not, the proxy cache controller circuit 120(0) can communicate the memory atomic request 132A to the global cache controller 122 to determine if the memory atomic request 132A is a cache hit in another cache memory 114(1)(0)-114(D)(C) in another respective compute die 104(1)-104(D).

With continuing reference to FIG. 2C, in response to determining the memory atomic request 132A is a cache hit in another cache memory 114(0)(0)-114(0)(C) in the same compute die 104(0) for example (block 244 in FIG. 2C), the proxy cache controller circuit 120(0) communicates a clean unique snoop request 140 for the memory write address 134A of the memory atomic request 132A to the CPU core 108 assigned to the other cache memory 114(0)(0)-114(0)(C)-114(D)(0)-114(D)(C) that has a cache hit (block 246 in FIG. 2C). In response to determining the memory atomic request 132A is a cache hit in another cache memory 114(0)(0)-114(0)(C) in another compute die 104(1)-104(D) (block 244 in FIG. 2C), the proxy cache controller circuit 120(0) communicates a memory atomic request 132A to the global cache controller circuit 122 to be serviced (block 246 in FIG. 2C). The proxy cache controller circuit 120(0) then receives read data 138R for the memory write address 134A in the other cache memory 114(0)(0)-114(0)(C) on the same compute die 104(0) or from the global cache controller 122 from another cache memory 114(1)(0)-114(D)(C) stored in another compute die 104(1)-104(D) (block 248 in FIG. 2C). The proxy cache controller circuit 120(0) receives the atomic operation 144 from the CPU core 108 (block 250 in FIG. 2C). The proxy cache controller circuit 120(0) then performs the atomic operation 144 on the read data 138R to generate write data 138W (block 252 in FIG. 2C), and stores the write data 138W (block 254 in FIG. 2C). The write data 138W may be written back to the system memory 118.

More specific examples of memory transactions performed in the multi-level hierarchy cache system 102 in FIG. 1 will now be described with regard to FIGS. 3A-5B. FIGS. 3A-3C describe example processes for performing memory read requests in the multiple-level hierarchy cache system 102 in FIG. 1. FIGS. 4A-4C describe example processes for performing memory write requests in the multiple-level hierarchy cache system 102 in FIG. 1. FIGS. 5A and 5B describe example processes for performing memory atomic requests in the multiple-level hierarchy cache system 102 in FIG. 1. The exemplary processes in FIGS. 3A-5B use processes involving two (2) CPU cores 108(0)(0) and 108(0)(C) and the proxy cache controller circuit 120(0) in the compute die 104(0), the global cache controller circuit 122, and two (2) CPU cores 108(D)(0) and 108(D)(C) and the proxy cache controller circuit 120(D) in the compute die 104(D) as examples. However, note that the processes in FIGS. 3A-5B can involve any of the CPU cores 108(0)(0)-108(0)(C)-108(D)(0)-108(D)(C) and their respective proxy cache controller circuits 120(0)-120(D) on the compute dies 104(0)-104(D).

FIG. 3A is an exemplary memory read request process 300A of performing a memory read request in the multiple-level hierarchy cache system 102 in FIG. 1 that results in a cache miss to a local cache memory 112(0)-112(D) in a respective compute die 104(0)-104(D) of a respective requesting CPU core 108(0)(0)-108(0)(C)-108(D)(0)-108(D)(C). In this example, CPU core(0)(0) is labeled Core-A0 and means compute die A 104(0), core 0. CPU core(0)(C) is labeled "Core-A3" and means compute die A 104(0), core C in compute die A 104(0), where 'C' can be '3' or signify any number of C+1 CPU cores 108 in compute die A 104(0). Also in this example, CPU core(D)(0) is labeled Core-B0 and means compute die B 104(D), core 0. CPU core(D)(C) is labeled "Core-B3" and means compute die B 104(D), where 'D' can signify any number of D+1 compute dies 104, and core C in compute die B 104(D), where 'C' can be '3' or signify any number of CPU cores 108 in compute die B 104(D). As discussed in more detail below, such a memory read request involves communication between the proxy cache controller circuit 120(0)-120(D) in the respective compute die 104(0)-104(D) of the requesting CPU core 108(0)(0)-108(0)(C)-108(D)(0)-108(D)(C) and the global cache controller circuit 122 to retrieve the requested valid cache line from the system memory 118.

In this regard, with reference to FIG. 3A, the memory read request process 300A involves a requestor CPU core 108(0)(0) communicating a shared memory read request 132R to the proxy cache controller circuit 120(0) on its compute die 104(0), because the requestor CPU core 108(0)(0) has determined that the memory read address 134R in its assigned cache memory 114(0)(0) is invalid based on a tag L2 in the cache memory 114(0)(0) associated with the memory read address 134R (302 in FIG. 3A). For example, this is indicated in FIG. 3A by the notation "L2[X]=I," where 'L2' is the cache memory 114(0)(0), 'X' is the index into the cache memory 114(0)(0) based on the memory read address 134R, and 'I' indicates an invalid state. In other words, the memory read request 132R by the requestor CPU core 108(0)(0) has resulted in a cache miss into its assigned cache memory 114(0)(0). Thus, the requestor CPU core 108(0)(0) makes the memory read request 132R to the proxy cache controller circuit 120(0) on its local compute die 104(0), which also resulted in a cache miss.

Then, in this example as also shown in FIG. 3A, in response to the cache miss, the proxy cache controller circuit 120(0) issues the memory read request 132R over the D2D interface circuit 126(0) to the global cache controller circuit 122, which in this example is on the I/O die 116 (304 in FIG. 3A). This is because in this example, the proxy cache controller circuit 120(0) has determined that none of the other cache memories 114(0)(1)-114(0)(C) on the compute die 104(0) contain a valid, shared copy of the read data 138R associated with the memory read address 134R of the memory read request 132R. This is indicated by the invalid cache state (CS(0)=I) for the memory read address 134R. For example, this is indicated in FIG. 3A by the notation "ST[X]=I," where 'ST' is the cache state, 'X' is the index into the cache memory 114(0)(0) based on the memory read address 134R, and 'I' indicates an invalid state. In this example, a local cache line directory ST(0) (which is a memory circuit) is associated with and accessible by the proxy cache controller circuit 120(0). The local cache line directory ST(0) contains a cache state indicator CS(0) that is updated with the cache states of cache lines associated with the memory read addresses contained in its local cache memory 112(0) comprised of the cache memories 114(0)(0)-114(0)(C) on the compute die 104(0) assigned to the respective CPU cores 108(0)(0)-108(0)(C).

In this example, the memory read requests 132R communicated by the proxy cache controller circuit 120(0) to the global cache controller circuit 122 includes an indication of the requestor CPU core 108(0)(0) (shown as Core-A0) so that the read data 138R associated with the memory read request 132R, when obtained, is communicated back to the requestor CPU core 108(0)(0) (304 in FIG. 3A). This is implemented in this example, because the CPU cores 108(0)(0)-108(0)(C) would otherwise be transparent to the global cache controller circuit 122 since the global cache controller circuit 122 can perform a standard cache coherence protocol. The global cache controller circuit 122 would otherwise only have knowledge of the proxy cache controller circuits 120(0)-120(D). This feature allows the global cache controller circuit 122 to provide for the eventually obtained read data 138R to be communicated directly back to the requestor CPU core 108(0)(0) to reduce memory access latency.

In this example, the global cache controller circuit 122 then issues a read access request 137R that includes the identification of the requestor CPU core 108(0)(0) (Core-A0) that will cause the read data 138R to be accessed from the system memory 118 (block 306 in FIG. 3A). The global cache controller circuit 122 issues the read access request 137R to the memory controller 129 in this example, which can obtain the requested read data 138R for the memory read address 134R from the system memory 118. This is because the global cache controller circuit 122 determines by accessing its global cache line directory ST(G) (which is a memory circuit) that the none of the other cache memories 114(1)(0)-114(D)(C) on the other compute dies 104(1)-104(D) contain a valid, shared copy of the read data 138R associated with the memory read address 134R of the memory read request 132R. This is indicated by the invalid global cache state for the memory read address 134R (CS(G)=I). The global cache line directory ST(G) contains a cache state indicator CS(G) that is updated with the cache state of cache lines associated with memory read addresses contained in its global cache memory 110 comprised of the cache memories 114(0)(0)-114(D)(C) on the compute dies 104(0)-104(D).

Then, as shown in FIG. 3A, the global cache controller circuit 122 is configured to issue a response data message (RepSepData) to the proxy cache controller circuit 120(0) acknowledging receipt of the memory read request 132R (308 in FIG. 3A), which is then acknowledged (CompAck) back from the proxy cache controller circuit 120(0) to the global cache controller circuit 122 (310 in FIG. 3A). The global cache controller circuit 122 updates the cache state indictor CS(G) in its global cache line directory ST(G)[X] for the memory read address 134R to '0001' to indicate that the proxy cache controller circuit 120(0) will have a copy of the read data 138R for the memory read address 134R and with its cache state indicator CS (G) indicating a unique clean (UC) cache state. The cache state indicator bits in this example use the least significant bit to represent the cache state indicator for CPU core 0 and the most significant bit to represent the cache state indicator for CPU core C in their respective die 104(0)-104(D). This data is used for other processing by the global cache controller circuit 122 to have knowledge of which proxy cache controller circuits 120(0)-120(D) control access to memory addresses addressable in the processor-based system 100.

The proxy cache controller circuit 120(0) is configured to issue a response data message (RepSepData) to the requestor CPU core 108(0)(0) acknowledging receipt of the memory read request 132R (312 in FIG. 3A), which is then acknowledged (CompAck) back from the requestor CPU core 108(0)(0) to the proxy cache controller circuit 120(0) (314 in FIG. 3A). These messages may be part of a standard cache coherence protocol, such as the coherent hub interface (CHI) cache coherence protocol. This concept is also applicable to cache coherence protocols other than CHI as illustrated in examples herein. The proxy cache controller circuit 120(0) and requestor CPU core 108(0)(0) are configured to update their respective tag L2 and local cache line directory ST(0) indicating that local cache memory 112(0) associated with the proxy cache controller circuit 120(0) and cache memory 114(0)(0) associated with the requestor CPU core 108(0)(0) will have a shared copy of the read data 138R for the memory read address 134R. This is indicated by cache state indicator CS(0) for the local cache line directory ST(0)[X] being updated to '0001' with the least significant bit indicating that the cache memory 114(0)(0) associated with the requestor CPU core 108(0)(0) will have a valid copy of the read data 138R with proxy owned (PO)='1' (true) meaning the memory read address 134R is owned by the proxy cache controller circuit 120(0) with a cache state (S)='UC' (unique clean). This is also indicated by tag L2[X] for the CPU core 108(0)(0) having a cache state of 'UC' for the memory read address 134R meaning that the cache memory 114(0)(0) has a unique clean copy of the read data 138R. These tags and indicators are used for other processes to indicate cache state and status for operations.

Then, as shown in FIG. 3A, the memory controller 129 communicates the retrieved read data 138R for the memory read request 132R directly to the requestor CPU core 108(0)(0) using the previously received identification of the requestor CPU core 108(0)(0) (Core-A0) from the read access request 137R (318 in FIG. 3A).

FIG. 3B is an exemplary memory read request process 300B of performing a memory read request in the multiple-level hierarchy cache system 102 in FIG. 1 that results in a cache hit to a local cache memory 114 in the same compute die 104 as the requesting CPU core 108. In this example, the memory read request process 300B in FIG. 3B involves a requestor CPU core 108(0)(0) communicating a shared memory read request 132R to the proxy cache controller circuit 120(0) on its compute die 104(0), because the requestor CPU core 108(0)(0) has determined that the memory read address 134R in its assigned cache memory 114(0)(0) is invalid (I) based on a tag L2[X] in the cache memory 114(0)(0) associated with the memory read address 134R (320 in FIG. 3B). In other words, the memory read request 132R by the requestor CPU core 108(0)(0) has resulted in ca ache miss into its assigned cache memory 114(0)(0). Thus, the requestor CPU core 108(0)(0) makes the memory read request 132R to the proxy cache controller circuit 120(0) on its local compute die 104(0).

Then, as shown in FIG. 3B, in this example, the proxy cache controller circuit 120(0) determines that cache memory 114(0)(C) assigned to CPU core 108(0)(C) has a valid copy of the read data 138R for the memory read request 132R. This is based on the proxy cache controller circuit 120(0) determining from its local cache line directory ST(0)[X] for the memory read address 134R that the CPU core 108(0)(C) controls a shared copy in a shared clean (SC) cache state of read data 138R for the memory read address 134R based on the local cache line directory ST(0)[X] having a cache state indicator CS(0) indicating '1000' with an SC cache state. In this response, the proxy cache controller circuit 120(0) issues a read access snoop request 136R to the CPU core 108(0)(C) (322 in FIG. 3B). This causes the proxy cache controller circuit 120(0) to update its local cache line directory ST(0)[X] for the memory read address 134R to indicate that now both CPU core 108(0)(0) and 108(0)(C) have access to a valid copy of the read data 138R for the memory read address 134R in a shared clean (SC) cache state (324 in FIG. 3B).

In this example, the global cache controller circuit 122 does not necessarily need account for the fact that a cache line previously in a clean unique state the CPU core 108(0)(C) on die 104(0) is now in shared clean cache state on two (2) CPU cores on the die 104(0). From the perspective of the global cache controller circuit 122, the memory read address 132R is still uniquely owned by the specific proxy cache controller circuit 120(0). The memory read address 132R may be shared by multiple CPU cores 108(0)(0)-108(0)(C) on the die 104(0), with coherency managed by the proxy cache controller circuit 120(0), so that on the die 104(0), the memory read address 132R is actually shared. The proxy cache controller circuit 120(0) abstracts all the CPU cores 108(1)(0)-108(D)(C) from the global cache controller circuit 122. The proxy cache controller circuit 120(0) effectively looks like a single CPU core to the global cache controller circuit 122. Similarly, when the proxy cache controller 120(0) gives a CPU core 108(0)(0)-108(0)(C) unique ownership of an address, the CPU core 108(0)(0)-108(0)(C) is allowed to internally downgrade its cache state to shared (however it must then issue another request for ownership if it wants to modify the address). The same is true for the other proxy cache controller circuits 120(1)-120(D).

Also, in response to the proxy cache controller circuit 120(0) issuing the read access snoop request 136R to the CPU core 108(0)(C), the CPU core 108(0)(C) accesses its cache memory 114(0)(C) for the memory read address 134R and provides the associated read data 138R to the requestor CPU core 108(0)(0) (326 in FIG. 3B). In this example, the CPU core 108(0)(C) is configured to forward the read data 138R directly to the requestor CPU core 108(0)(0) (326 in FIG. 3B), but the read data 138R could alternatively be communicated back to the proxy cache controller circuit 120(0) to be provided to the requestor CPU core 108(0)(0). The requestor CPU core 108(0)(0) acknowledges receipt of the read data 138R (328 in FIG. 3B).

FIG. 3C is an exemplary memory read request process 300C of performing a memory read request in the multiple-level hierarchy cache system 102 in FIG. 1 that results in a cache miss to the local cache memory 114 in the compute die 104 of the requesting CPU core 108. The memory read request process 300C involves communication between the proxy cache controller circuit 120(0) and the global cache controller circuit 122 to retrieve the requested valid cache line from another local cache memory 114 in another compute die 104.

In this regard, with reference to FIG. 3C, the memory read request process 300C involves a requestor CPU core 108(0)(0) communicating a shared memory read request 132R to the proxy cache controller circuit 120(0) on its compute die 104(0), because the requestor CPU core 108(0)(0) has determined that the memory read address 134R in its assigned cache memory 114(0)(0) is invalid based on a tag L2 in the cache memory 114(0)(0) associated with the memory read address 134R (330 in FIG. 3C). For example, this is indicated in FIG. 3C by the notation "L2[X]=I," where 'L2' is the cache memory 114(0)(0), 'X' is the index into the cache memory 114(0)(0) based on the memory read address 134R, and 'I' indicates an invalid state. In other words, the memory read request 132R by the requestor CPU core 108(0)(0) has resulted in a cache miss into its assigned cache memory 114(0)(0). Thus, the requestor CPU core 108(0)(0) makes the memory read request 132R to the proxy cache controller circuit 120(0) on its local compute die 104(0).

Then, in this example as also shown in FIG. 3C, the proxy cache controller circuit 120(0) issues the memory read request 132R over the D2D interface circuit 126(0) to the global cache controller circuit 122, which in this example is on the I/O die 116 (332 in FIG. 3C). This is because in this example, the proxy cache controller circuit 120(0) has determined that none of the other cache memories 114(0)

(1)-114(0)(C) on the compute die 104(0) contain a valid, shared copy of the read data 138R associated with the memory read address 134R of the memory read request 132R. This is indicated by the invalid cache state in the cache state indicator CS(0)=I for the memory read address 134R. For example, this is indicated in FIG. 3C by the notation "ST(0)[X]=I," where 'ST' is the local cache line directory having a cache state indicator CS(0) of invalid (I) indexed by 'X' into the cache memory 114(0)(0) based on the memory read address 134R. In this example, a local cache line directory ST(0) is associated with and accessible by the proxy cache controller circuit 120(0). The local cache line directory ST(0) contains a cache state indicator CS(0) that is updated with cache states of cache lines associated with the memory read addresses contained in its local cache memory 112(0) comprised of the cache memories 114(0) (0)-114(0)(C) on the compute die 104(0) assigned to the respective CPU cores 108(0)(0)-108(0)(C).

In this example, the memory read request 132R communicated by the proxy cache controller circuit 120(0) to the global cache controller circuit 122 includes an indication of the requestor CPU core 108(0)(0) (shown as Core-A0) so that the read data 138R associated with the memory read request 132R, when obtained, is communicated back to the requestor CPU core 108(0)(0) (332 in FIG. 3C). This is implemented in this example, because the CPU cores 108 (0)(0)-108(0)(C) would otherwise be transparent to the global cache controller circuit 122 since the global cache controller circuit 122 can perform a standard cache coherence protocol. The global cache controller circuit 122 would otherwise only have knowledge of the proxy cache controller circuits 120(0)-120(D). This feature allows the global cache controller circuit 122 to provide for the eventually obtained read data 138R to be communicated directly back to the requestor CPU core 108(0)(0) to reduce memory access latency.

In this example, the global cache controller circuit 122 then issues a read access snoop request 136R that includes the identification of the requesting proxy cache controller circuit 120(0) that will cause the read data 138R to be accessed from compute die 104(D) through communication to the proxy cache controller circuit 120(D) (334 in FIG. 3C). The global cache controller circuit 122 issues the read access snoop request 136R to the proxy cache controller circuit 120(D) in this example, which can obtain the requested read data 138R from its local cache memory 112(D). This is because the global cache controller circuit 122 determines by accessing its global cache line directory ST(G) that the local cache memory 112(D) on the compute die 104(D) contains a valid copy of the read data 138R associated with the memory read address 134R of the memory read request 132R. This is indicated by the global cache line directory ST(G) containing a cache state indicator CS(G) of '1000' with a unique clean (UC) cache state indicating that the local cache memory 112(D) on the compute die 104(D) contains a valid, unique clean copy of the read data 138R.

Then, as shown in FIG. 3C, the global cache controller circuit 122 is configured to issue the read access snoop request 136R to the proxy cache controller circuit 120(D) (334 in FIG. 3C). The read access snoop request 136R includes an indication of the proxy cache controller circuit 120(0) as the requestor proxy cache controller circuit, so that the proxy cache controller circuit 120(D) has knowledge of the requestor proxy cache controller circuit and can provide the requested read data 138R directly back to the requestor proxy cache controller circuit 120(0). The proxy cache controller circuit 120(D) then issues the read access snoop request 136R to the CPU core 108(D)(0) (336 in FIG. 3C). The proxy cache controller circuit 120(D) determined that the cache memory 114(D)(0) associated with the CPU core 108(D)(0) contains a valid copy of the read data 138R for the memory read address 134R based on the local cache line directory ST[D][X] having a cache state indicator CS(D) of '0001' with a cache state of unique clean (UC) indicating that the cache memory 114(D)(0) associated with the CPU core 108(D)(0) contains a valid copy of the read data 138R. The CPU core 108(D)(0) issues a snoop response acknowledgment (SnpRespData) providing the read data 138R for the memory read address 134R from its cache memory 114(D)(0) (338 in FIG. 3C). The proxy cache controller circuit 120(D) then communicates the read data 138R back to the requestor proxy cache controller circuit 120(0) (340 in FIG. 3C). The proxy cache controller circuit 120(D) updates the cache state for the memory read address 134R to a shared clean (SC) cache state since the compute die 104(0) now has a copy of the read data 138R for the memory read address 134R. The proxy cache controller circuit 120(D) also communicates a shared cache state snoop response (SnpRespSC) to the global cache controller circuit 122 (342 in FIG. 3C).

In response to the proxy cache controller circuit 120(0) receiving a copy of the read data 138R for the memory read address 134R from the proxy cache controller circuit 120(D) (340 in FIG. 3C), the proxy cache controller circuit 120(0) issues an acknowledgement (CompAck) to the global cache controller circuit 122 (344 in FIG. 3C). This global cache controller circuit 122 updates its cache state indicator CS(G) to ST(G)[X]='1001' indicating that both proxy cache controller circuits 120(0), 120(D) control a valid copy of the read data 138R for the memory read address 134R as well as updating its cache state to a shared dirty (SD) state as well. This data is used for other processing by the global cache controller circuit 122 to have knowledge of which proxy cache controller circuits 120(0)-120(D) control access to memory addresses addressable in the processor-based system 100. The proxy cache controller circuit 120(0) is configured to communicate the read data 138R for the memory read address 134R to the requestor CPU core 108(0)(0) (346 in FIG. 3C), which is then acknowledged (CompAck) back from the requestor CPU core 108(0)(0) to the proxy cache controller circuit 120(0) (348 in FIG. 3C). The proxy cache controller circuit 120(0) and requestor CPU core 108(0)(0) are configured to update their respective tag L2 and local cache line directory ST(0) indicating that the local cache memory 112(0) associated with the proxy cache controller circuit 120(0) and the cache memory 114(0)(0) associated with the requestor CPU core 108(0)(0) will have a shared copy of the read data 138R for the memory read address 134R. This is indicated by cache state indicator CS(0) of the local cache line directory ST(0)[X] being updated to '0001' with the least significant bit indicating that the cache memory 114(0)(0) associated with the requestor CPU core 108(0)(0) will have a valid copy of the read data 138R with proxy owned (PO)='0' (false) meaning the memory read address 134R is shared by the proxy cache controller circuit 120(0) with cache state (S)='SD' (shared dirty). This is also indicated by tag L2[X] for the CPU core 108(0)(0) having a cache state of 'SD' for the memory read address 134R meaning that the cache memory 114(0)(0) has a shared dirty copy of the read data 138R. These tags and indicators are used for other processes to indicate cache state and status for operations.

In this example, CPU core 108(D)(0) started off in the UD (unique dirty) state. Proxy cache controller 120(D) and the global cache controller 122 does and need not know that the CPU core 108(D)(0) modified the memory location-just that the memory read address 134R had previously been given a unique state, which is sufficient for the coherency protocol. Then when CPU core 108(D)(0) receives the snoop request, it keeps a shared copy of the memory location in the clean state and passes the shared copy in the dirty state-in CHI, PD=pass dirty. The snoopee is allowed to pass the dirty state to its proxy cache controller circuit 120(D) or the requestor CPU core 108(D)(0). So in this example, the dirty state is ultimately passed to the requesting CPU core 108(D)(0).

FIG. 4A is an exemplary memory write request process 400A of performing a memory write request in the multiple-level hierarchy cache system 102 in FIG. 1 that results in a cache hit that is proxy owned in a cache memory 114 in the same compute die 104 as the requesting CPU core 108. In this regard, as shown in FIG. 4A, the requestor CPU core 108(0)(0) issues a clean unique request 136W for a memory write request 132W to the proxy cache controller circuit 120(0) on its same compute die 104(0) (402 in FIG. 4A). This is to request a clean unique cache state for a memory write address 134W associated with a memory write request 132W. This is because the requestor CPU core 108(0)(0) desires to store write data 138W to a memory write address 134W, but the cache state for the memory write address 134W is a shared clean (SC) state as indicated by tag L2[X] indicating a SC cache state for 'X' for the memory write address 134W in the cache memory 114(0)(0). In order to store the write data 138W in the cache memory 114(0)(0), the cache memory 114(0)(0) needs to have a unique cache state for the memory write address 134W.

Then, as shown in FIG. 4A, in response to the clean unique request 136W, the proxy cache controller circuit 120(0) determines that cache memory 114(0)(C) assigned to CPU core 108(0)(C) has a shared cache state for the memory write address 134W. This is indicated by the cache state indicator CS(0) having '1001' with a cache state of shared clean (SC) in its local cache line directory ST(0)[X] for the memory write address 134W, signifying that both cache memory 114(0)(0) and 114(0)(C) have a shared cache state for the memory write address 134W. The cache state indicator CS(0) also indicates that the memory write address 134W is proxy owned, by PO being set to '1' or true, so this means that there is no other copy of the write data 138W from the global cache controller circuit 122 to invalidate in another compute die 104(1)-104(D). In response, the proxy cache controller circuit 120(0) issues a snoop clean invalidate 142 (SnpCleanInvalid) to the CPU core 108(0)(C) (404 in FIG. 4A) to cause the CPU core 108(0)(C) to invalidate the memory write address 134W in its assigned cache memory 114(0)(C), as indicated by the tag L2[X] being updated to the invalid (I) cache state. The CPU core 108(0) (C) then issues a snoop invalidate response (SnpResp_I) back to the proxy cache controller circuit 120(0) (406 in FIG. 4A), which in turn causes the proxy cache controller circuit 120(0) to issue a completion unique clean state (Comp_UC) response to the CPU core 108(0)(0) indicating that the CPU core 108(0)(0) now has a clean unique cache state for the memory write address 134W (408 in FIG. 4A).

In this manner, the CPU core 108(0)(0) can now update the cache state in the cache state indicator CS(0) for the memory write address 134W in local cache line directory ST(0)[X] to a unique clean (UC) state (i.e., S=UC). The proxy cache controller circuit 120(0) updates its cache state indicator CS(0) in its local cache line directory ST(0)[X] for the memory write address 134W to indicate that only CPU core 108(0)(0) has a copy of the write data 138W on the compute die 104(0) for the memory write address 134W signified by '0001', with a proxy owned (PO) state of '1' (true) and cache state of unique clean (UC). The CPU core 108(0)(0) is now allowed to commit a store operation for the memory write request 132W to the memory write address 134W, which will then change the cache state for the memory write address 134W in local cache line directory ST(0)[X] to dirty until the write data 138W for the memory write address 134W is written back to system memory 118. The CPU core 108(0)(0) issues a completion acknowledgement (CompAck) back to the proxy cache controller circuit 120(0) when the write operation is completed (410 in FIG. 4A). In this example, because the memory write request 132W resulted in a cache hit that is proxy owned in a cache memory 114 in the same compute die 104 as the requesting CPU core 108(0)(0), the CPU core 108(0)(0) can obtain unique ownership of the memory write address 134W without the global cache controller circuit 122 having to be involved.

FIG. 4B is an exemplary memory write request process 400B of performing a memory write request in the multiple-level hierarchy cache system 102 in FIG. 1 that results in a cache miss in a local cache memory in the compute die 104 of the requesting CPU core 108. As discussed below, because the memory write request is to a proxy cache controller circuit that does not have the memory write address of the memory write request in a proxy owned state, the memory write request process 400B involves communication between the proxy cache controller circuit 120 in the compute die 104 and the global cache controller circuit 122 to invalidate the memory write address in the cache memory 114 in another compute die(s) 104 to obtain unique ownership of the requested cache line.

In this regard, with reference to FIG. 4B, the memory write request process 400B involves a requestor CPU core 108(0)(0) issuing a clean unique request 136W for a memory write request 132W to the proxy cache controller circuit 120(0) on its same compute die 104(0) (420 in FIG. 4B). This is to request a clean unique cache state for a memory write address 134W associated with a memory write request 132W. This is because the requestor CPU core 108(0)(0) desires to store write data 138W to a memory write address 134W, but the cache state for the memory write address 134W is a shared clean (SC) state as indicated by tag L2[X] indicating a SC cache state for 'X' for the memory write address 134W in the cache memory 114(0)(0). In order to store the write data 138W in the cache memory 114(0)(0), the cache memory 114(0)(0) needs to have a unique cache state for the memory write address 134W.

Then, as shown in FIG. 4B, in response to the clean unique request 136W, the proxy cache controller circuit 120(0) determines that cache memory 114(0)(C) assigned to CPU core 108(0)(C) has a shared cache state for the memory write address 134W. This is indicated by the cache state indicator CS(0) having '1001' with a cache state of shared clean (SC) in its local cache line directory ST(0)[X]='1001' for the memory write address 134W, signifying that both cache memory 114(0)(0) and 114(0)(C) have a shared cache state for the memory write address 134W. In response, the proxy cache controller circuit 120(0) issues a snoop clean invalidate 142 (SnpCleanInvalid) to the CPU core 108(0)(C) (422 in FIG. 4B) to cause the CPU core 108(0)(C) to invalidate the memory write address 134W in its assigned cache memory 114(0)(C), as indicated by the tag L2[X] for the memory write address 134W being updated to the invalid (I) cache state. The CPU core 108(0)(C) then issues a snoop invalidate response (SnpResp_I) back to the proxy cache controller circuit 120(0) (424 in FIG. 4B).

Then, as shown in FIG. 4B, the proxy cache controller circuit 120(0) issues the clean unique request 136W to the global cache controller circuit 122 (426 in FIG. 4B). This is because the memory write address 134W is determined by the proxy cache controller circuit 120(0) to not be proxy owned based on the cache state indicator CS(0) in the local cache line directory ST(0)[X] for the memory write address 134W indicating that proxy owned (PO)='0' or false. Thus, this means that the write data 138W for the memory write address 134W may be present in at least one other compute die 104(1)-104(D) that must also be invalidated via a snoop clean invalidate process. In this regard, as shown in FIG. 4B, the proxy cache controller circuit 120(D) based on the determination in the cache state indicator CS(G) in the global cache line directory ST(G)[X] for the memory write address 134W that the compute die 104(D) has a valid copy of the write data 138W for the memory write address 134W of the memory write request 132W based on the cache state indicator value '1001' (428 in FIG. 4B).

In response to the proxy cache controller circuit 120(D) receiving the clean unique request 136W from the global cache controller circuit 122, the proxy cache controller circuit 120(D) issues a snoop clean invalidate 142 (SnpCleanInvalid) to the CPU cores 108(D)(0)-108(D)(C) (430, 432 in FIG. 4B). This causes the CPU cores 108(D)(0)-108(D)(C) to invalidate the memory write address 134W in their assigned cache memories 114(D)(0)-114(D)(C), as indicated by their tags L2[X] being updated to the invalid (I) cache state for the memory write address 134W. The CPU cores 108(D)(0)-108(D)(C) then issue snoop invalidate responses (SnpResp_I) back to the proxy cache controller circuit 120(D) (434, 436 in FIG. 4B), which in turn causes the proxy cache controller circuit 120(D) to update the cache state indicator CS(D) in the local cache line directory ST(D)[X] for the memory write address 134W to an invalid cache state (I). The proxy cache controller circuit 120(D) then issues a snoop invalidate response (SnpResp_I) back to the global cache controller circuit 122 (438 in FIG. 4B) to indicate that the memory write address 134W has been successfully invalidated in the compute die 104(D). The global cache controller circuit 122 then updates the global cache state indicator CS(G) in the global cache line directory ST(G)[X]='0001' for the memory write address 134W to indicate that only the compute die 104(0) will have a valid clean unique state of the memory write address 134W.

Then, as shown in FIG. 4B, the global cache controller circuit 122 issues a completion unique clean state (Comp_UC) response to the proxy cache controller circuit 120(0) indicating that memory write address 134W is now proxy owned by the proxy cache controller circuit 120(0) (440 in FIG. 4B). The proxy cache controller circuit 120(0) updates the cache state indicator CS(0) in its local cache line directory ST(0)[X] for the memory write address to '0001' to indicate that the compute die 104(0) has the unique copy of the write data 138W for the memory write address 134W. The proxy cache controller circuit 120(0) also updates the cache state indicator CS(0) in its local cache line directory ST(0)[X] to indicate that the memory write address 134W is proxy owned (PO='1') and in a unique clean (UC) state in the compute die 104(0). The proxy cache controller circuit 120(0) then issues a completion unique clean state (Comp_UC) response to the requestor CPU core 108(0)(0) indicating that memory write address 134W is now in a clean unique state so that the requestor CPU core 108(0)(0) can now store the write data 138W in its cache memory 114(0)

(0) for the memory write address 134W and update its tag L2[X] for the memory write address 134W to a unique clean (UC) state (442 in FIG. 4B). The CPU core 108(0)(0) issues a completion acknowledgement (CompAck) back to the proxy cache controller circuit 120(0) when the write operation is completed (444 in FIG. 4B).

FIG. 4C is an exemplary memory write back request process 400C of performing a memory write back request (e.g., a dirty cache eviction) in the multiple-level hierarchy cache system 102 in FIG. 1 as a result of a local cache memory 112 eviction that involves communication between the proxy cache controller circuit 120 in the compute die 104 to the global cache controller circuit 122. The memory write back request process 400C is performed if an eviction needs to be performed by a CPU core 108 as a result of storing write data 138W in its assigned cache memory 114, such as per the memory write processes 400A, 400B in FIGS. 4A and 4B).

In this regard, as shown in FIG. 4C, a requestor CPU core 108(0)(0) issues a write back request 132WB that includes the memory write address 134W to be evicted to the proxy cache controller circuit 120(0) on its compute die 104(0) in response to an eviction of cached data from its assigned cache memory 114(0)(0) (450 in FIG. 4C). The proxy cache controller circuit 120(0) issues a write back response (CmopDBIDResp) back to the requestor CPU core 108(0)(0) to acknowledge receipt of the write back request 132WB (452 in FIG. 4C). This causes the requestor CPU core 108(0)(0) to update its tag L2[X] for the memory write address 134W to be evicted to an invalid state (I). The requestor CPU core 108(0)(0) then sends a copy of the write data 138W to be evicted in a copy back response (CopyBackWrData) to the proxy cache controller circuit 120(0) (454 in FIG. 4C). The proxy cache controller circuit 120(0) then issues a write clean request (write clean full-WriteCleanFull-X in this example) for the write data 138W for the memory write address 134W to the global cache controller circuit 122 (456 in FIG. 4C), which in turn issues a write back response (CmopDBIDResp) back to the proxy cache controller circuit 120(0) to acknowledge receipt of the write clean request (WriteCleanFull-X) (458 in FIG. 4C). The write clean request of a write clean full (WriteCleanFull) is used in this instance instead of a write back full (WriteBackFull), because there are other CPU cores 108(0)(0)-108(0)(C) on the compute die 104(0) that have a copy of the memory write address 132W. Thus, from the perspective of the global cache controller circuit 222, the proxy cache controller 120(0) still retains a copy of the cache line at the memory write address 132 even though it is performing a write copy back operation. The proxy cache controller circuit 120(0) then sends a copy of the write data 138W to be written back in a copy back response (CopyBackWrData) to the global cache controller circuit 122 (460 in FIG. 4C).

Then, as shown in FIG. 4C, the global cache controller circuit 122 updates the cache state indicator CS(G) in the global cache line directory ST(G)[X] for the memory write address 134W to be in a shared clean (SC) cache state. The global cache controller circuit 122 then issues a write, no snoop request (WriteNoSnp-X) for the memory write address 134W to be written back to the memory controller 129, to set up the write back of the write data 138W evicted to the system memory 118 (462 in FIG. 4C). The memory controller 129 then issues a write back response (CmopDBIDResp) back to the global cache controller circuit 122 to acknowledge receipt of the write, no snoop request (WriteNoSnp-X) (464 in FIG. 4C). The global cache controller circuit 122 then sends a copy of the write data 138W to be written back in a copy back response (NonCopyBack-WrData) to the memory controller 129 to be written to the system memory 118 (block 466 in FIG. 4C).

The multiple-level hierarchy cache system 102 in the processor-based system 100 in FIG. 1 can also be configured to perform atomic memory operations and maintain cache coherency. Atomic memory operations involve a read-modify-write operation that is performed in a single step relative to other threads so that each of these operations is performed before any other thread can access the memory address of the atomic operation.

In this regard, FIG. 5A is an exemplary memory atomic request process 500A of a memory atomic request 132A that involves access through a proxy cache controller circuit 120 to a local cache memory 112 in the same compute die 104 without having to access the global cache controller circuit 122. This is because the requested read data for the memory atomic request 132A is valid and contained in the same compute die 104 as the proxy cache controller circuit 120.

In this regard, with reference to FIG. 5A, in this example, the requestor CPU core 108(0)(0) issues a memory atomic request 132A to the proxy cache controller circuit 120(0) (block 502 in FIG. 5A). This is because in this example, the requestor CPU core 108(0)(0) has determined that the memory write address 134W in its assigned cache memory 114(0)(0) is invalid based on an L2 tag in the cache memory 114(0)(0) associated with the memory read address 134R. For example, this is indicated in FIG. 5A by the notation "L2[X]=I," where 'L2' is the cache memory 114(0)(0), 'X' is the index into the cache memory 114(0)(0) based on the memory write address 134W, and 'I' indicates an invalid state. In other words, the memory atomic request 132A by the requestor CPU core 108(0)(0) has resulted in a cache miss in its assigned cache memory 114(0)(0). Thus, the requestor CPU core 108(0)(0) makes the memory atomic request 132A to the proxy cache controller circuit 120(0) on its local compute die 104(0). The proxy cache controller circuit 120(0) issues a memory atomic response (DBI-DResp) (504 in FIG. 5A).

Then, as shown in FIG. 5A, the proxy cache controller circuit 120(0) determines from the cache state indicator CS(0) in its local cache line directory ST(0)[X] for the memory write address 134W that the cache memory 114(0)(C) assigned to CPU core 108(0)(C) contains a proxy owned copy of the memory write address 134W in a unique clean (UC) cache state. Thus, the atomic memory operation can be performed on the compute die 104(0) without having to involve the global cache controller circuit 122. In this regard, the proxy cache controller circuit 120(0) issues a snoop unique invalidate request (SnpUnique) to the CPU core 108(0)(C) (506 in FIG. 5A), to then receive the read data 138R in a snoop response (SnpRespData_I) stored at the memory write address 134W from the cache memory 114(0)(C) assigned to the CPU core 108(0)(C) (508 in FIG. 5A). The CPU core 108(0)(C) then invalidates its unique copy of the read data 138R at the memory write address 134W in the cache memory 114(0)(C) (508 in FIG. 5A). The CPU core 108(0)(C) sets its tag L2[X] for the memory write address 134W to an invalid cache state (I).

As shown in FIG. 5A, in response to the requestor CPU core 108(0)(0) having received the memory atomic response (DBIDResp) (504 in FIG. 5A), the requestor CPU core 108(0)(0) sends the transaction data (NonCopyBackWr-Data) that includes the read data 138R for the atomic operation (e.g., an increment operation, a compare and swap operation) for the memory atomic request 132A to the proxy cache controller circuit 120(0) (510 in FIG. 5A). Now, the proxy cache controller circuit 120(0) can perform the memory atomic operation by performing the memory atomic operation using the received read data 138R (NonCopyBack WrData) and then writing the results of the atomic operation for the memory atomic request 132A to the memory write address 134A as write data 138W (512 in FIG. 5A). For example, the proxy cache controller circuit 120(0) can write back the write data 138W to the system memory 118 or to a shared cache memory for example, (e.g., a L3 cache memory). After the write operation, the proxy cache controller circuit 120(0) sends an atomic completion response (CompData_I) to the requestor CPU core 108(0)(0) to signify the memory atomic operation is completed along with a copy of the original data at the memory write address 134A 114(0)(0) (514 in FIG. 5A). The proxy cache controller circuit 120(0) also updates the cache state indicator CS(0) in the local cache line directory ST(0)[X] for the memory write address 134A to '0001' to indicate that the cache memory 114(0)(0) has the original data at the memory write address 134A of the memory atomic request 132A, but the write data 138W is in a unique dirty (UD) cache state.

FIG. 5B is an exemplary memory atomic request process 500B of a memory atomic request 132A that involves access through a proxy cache controller circuit 120 and the global cache controller circuit 122 since the requested data for the memory atomic request 132A is not stored in the compute die 104 of the proxy cache controller circuit 120. In this regard, with reference to FIG. 5B, in this example, the requestor CPU core 108(0)(0) issues a memory atomic request 132A to the proxy cache controller circuit 120(0) (520 in FIG. 5B). This is because in this example, the requestor CPU core 108(0)(0) has determined that the memory write address 134W in its assigned cache memory 114(0)(0) is invalid based on an L2 tag in the cache memory 114(0)(0) associated with the memory read address 134R. For example, this is indicated in FIG. 5B by the notation "L2[X]=I," where 'L2' is the cache memory 114(0)(0), 'X' is the index into the cache memory 114(0)(0) based on the memory write address 134W, and 'I' indicates an invalid state. In other words, the memory atomic request 132A by the requestor CPU core 108(0)(0) has resulted in a cache miss in its assigned cache memory 114(0)(0). Thus, the requestor CPU core 108(0)(0) makes the memory atomic request 132A to the proxy cache controller circuit 120(0) on its local compute die 104(0). The proxy cache controller circuit 120(0) issues a memory atomic response (DBI-DResp) back to the requestor CPU core 108(0)(0) (522 in FIG. 5B). In response to the requestor CPU core 108(0)(0) having received the memory atomic response (DBIDResp) (522 in FIG. 5B), the requestor CPU core 108(0)(0) sends the transaction data as the read data 138R (NonCopyBack-WrData) for the atomic operation (e.g., an increment operation, a compare and swap operation) of the memory atomic request 132A to be performed on read data 138R at the memory write address 134A to the proxy cache controller circuit 120(0) to be used later to perform the atomic memory operation (524 in FIG. 5B).

Then, as shown in FIG. 5B, the proxy cache controller circuit 120(0) determines from the cache state indicator CS(0) in its local cache line directory ST(0)[X] that the memory write address 134W has an invalid state meaning a cache miss. Thus, the atomic memory operation cannot be performed on the compute die 104(0) without having to involve the global cache controller circuit 122. In this regard, the proxy cache controller circuit 120(0) issues the memory atomic request 132A to the global cache controller circuit 122 (526 in FIG. 5A). The global cache controller circuit 122 issues a memory atomic response (DBIDResp) back to the proxy cache controller circuit 120(0) (528 in FIG. 5B). In response to the proxy cache controller circuit 120(0) having received the memory atomic response (DBI-DResp) (528 in FIG. 5B), the proxy cache controller circuit 120(0) forwards the memory atomic operation (NonCopy-BackWrData) (e.g., an increment operation, a compare and swap operation) to be performed on data to be read at the memory write address 134A to the global cache controller circuit 122 to be used later to perform the atomic memory operation (530 in FIG. 5B).

Then, as shown in FIG. 5B, the global cache controller circuit 122 issues a read, no snoop request (ReadNoSnp-X) to the memory controller 129 to obtain the read data 138R at the memory write address 134A of the memory atomic request 132A, because the global cache controller circuit 122 has determined that no other compute dies 104(1)-104 (D) have a valid copy of the read data 138R at the memory write address 134A (532 in FIG. 5B). This is because the cache state indicator CS(G) in the global cache line directory ST(G)[X] for the memory write address 134A indicates invalid. The global cache controller circuit 122 receives the read data 138R at the memory write address 134A from the memory controller 129 (534 in FIG. 5B). Now the global cache controller circuit 122 can perform the atomic operation by performing the memory atomic operation (NonCo-pyBack WrData) on the received read data 138R (536 in FIG. 5B) and then issues a write no snoop request (WriteNoSnp-X) writing the results to the memory write address 134A of the memory atomic request 132A as write data 138W to the system memory 118 (538 in FIG. 5B). The global cache controller circuit 122 then receives the write request completion (CompDBIDResp) back from the memory controller 129 (540 in FIG. 5B).

After the write operation is performed for the memory atomic request 132A, the global cache controller circuit 122 sends an atomic completion response (CompData_I) to the proxy cache controller circuit 120(0) to signify the memory atomic operation is completed along with a copy of the original read data 138R (542 in FIG. 5B). The proxy cache controller circuit 120(0) sends an atomic completion response (CompData_I) to the requestor CPU core 108(0)(0) to signify the memory atomic operation is completed along with a copy of the resulting write data 138W to be written to the cache memory 114(0)(0) (544 in FIG. 5B). The proxy cache controller circuit 120(0) also updates the cache state indicator CS(0) in the local cache line directory ST(0)[X] for the memory write address 134A as invalid (I) to indicate that the write data 138W was not cached due to having been written back to system memory 118 in block 538 in FIG. 5B.

FIG. 6 illustrates an example of another multi-die processor-based system 600 ("processor-based system 600") that can be the same or similar to the multi-die processor-based system 100 in FIG. 1. The processor-based system 600 includes a multi-level hierarchy cache system 602 that is configured to maintain cache coherency of cache memory distributed among a plurality of dies 604(0)-604(D) (e.g., like the compute dies 104(0)-104(D) in FIG. 1) that each have a respective first processor 606(1)-606(D) (e.g., like to the processors 106(0)-106(D) in FIG. 1). In this example, the processor-based system 600 is a multi-socket processor-based system that includes the multiple processors 606(0)-606(D) that are distributed among respective separate dies 604(1)-604(D). Each processor 606(0)-606(D) includes a respective plurality of CPU cores 608(0)(0)-608(0)(C)-608 (D)(0)-608(D)(C) (e.g., like the CPU cores 108(0)(0)-108 (0)(C)-108(D)(0)-108(D)(C) in FIG. 1) that are each configured to execute instructions to perform compute related tasks in its respective die 604(0)-604(D), where 'D'+1 is number of dies 604(0)-604(D) and respective processors 606(0)-606(D), where 'D' can be any whole positive number.

As further shown in FIG. 6, the multi-level hierarchy cache system 602 in the processor-based system 600 forms a global cache memory that includes respective local cache memories 612(0)-612(D) (e.g., like the local cache memories 112(0)-112(D) n FIG. 1) provided on each die 604(0)-604(D). If a cache miss occurs for a memory access request by a given CPU core 608(0)(0)-608(0)(C)-608(D)(0)-608(D)(C) to the local cache memory 612(0)-612(D) on its respective die 604(0)-604(D), the memory access request can be communicated off-die to an I/O die 616 (e.g., like the I/O die 116 in FIG. 1) that may contain the requested cached data and/or provide access to another local cache memory 612(0)-612(D) of another respective processor 606(0)-606(D) on a respective die 604(0)-604(D). To provide a single point of cache coherency for the multi-level hierarchy cache system 602, the processor-based system 600 in this example includes proxy cache controller circuits 620(0)-620(D) (e.g., like the proxy cache controller circuits 120(0)-120(D) in FIG. 1) on each respective die 604(0)-604(D), and a global cache controller circuit 622 (e.g., like the global cache controller circuit 622 in FIG. 1) and coupled to the respective CPU cores 608(0)(0)-608(0)(C)-608(D)(0)-608(D)(C) on its respective die 604(0)-604(D). In this example, the global cache controller circuit 622 is located on a separate I/O die 616, but could also be located on any of the dies 604(0)-604(D) as another example.

The proxy cache controller circuits 620(0)-620(D) are each configured to service memory access requests over the entire system address space of the processor-based system 600 to the local cache memory 612(0)-612(D) on its respective die 604(0)-604(D). In this manner, if a cache miss occurs for a given memory access request by a CPU core 608(0)(0)-608(0)(C)-608(D)(0)-608(D)(C), the memory access request can be communicated to the proxy cache controller circuit 620(0)-620(D) on its respective die 604(0)-604(D), which in turn can determine if the memory access request can be serviced by another local cache memory 612(0)-612(D) on its same respective compute die 104(0)-104(D). In this manner, the proxy cache controller circuits 620(0)-620(D) on each respective die 604(0)-604(D) can service memory access requests among its respective local cache memory 612(0)-612(D) and also maintain cache coherency of for its respective local cache memory 612(0)-612(D).

With continuing reference to FIG. 6, and as discussed above, if a cache miss occurs as a result of a proxy cache controller circuit 620(0)-620(D) not being able to service a memory access request by the local cache memory 612(0)-612(D) on its respective die 604(0)-604(D), the proxy cache controller circuit 620(0)-620(D) can forward this request off-die to the global cache controller circuit 622. In this regard, each die 604(0)-604(D) includes a respective D2D interface circuit 626(0)-626(D) that is coupled to a system bus 630. The proxy cache controller circuits 620(0)-620(D) are configured to communicate memory access requests to the global cache controller circuit 622 through their D2D interface circuits 626(0)-626(D) on its respective die 604(0)-604(D) and to the global cache controller circuit 622 through a respective D2D interface circuit 628 on the I/O die 616 that includes the global cache controller circuit 622. The global cache controller circuit 622 is configured to be able to communicate memory access requests to a system memory 618 through a memory controller 629 coupled to the system memory 618 to service memory access requests by the system memory 618 in the event of a complete cache miss to a local cache memory 612(0)-612(D) and/or for memory write backs as examples. The global cache controller circuit 622 is also configured to communicate with each of the proxy cache controller circuits 620(0)-620(D) to maintain cache coherency for the multi-level hierarchy cache system 602.

In this manner, as an example, a cache coherency protocol that is based on a single point of cache coherency can be implemented in the multi-die processor-based system 600 through the global cache controller circuit 622, but the proxy cache controller circuits 620(0)-620(D) in the respective dies 604(0)-604(D) are still capable of servicing memory access requests contained within the local cache memory 612(0)-612(D) of its die 604(0)-604(D), when possible, for lower latency memory transactions. In other words, because the proxy cache controller circuits 620(0)-620(D) are capable of servicing memory access requests solely within its die 604(0)-604(D) that can be so done and still maintain cache coherency, there is not a need to have to configure the proxy cache controller circuits 620(0)-620(D) to always communicate memory access requests to the off-die global cache controller circuit 622 to maintain cache coherency. Communication to the global cache controller circuit 622 for a memory transaction comes with a cost of additional latency for the memory transaction.

Any process including but not limited to the processes 200, 200W, 200A in FIGS. 2A-2C, processes 300A-300C in FIGS. 3A-3C, processes 400A-400C in FIGS. 4A-4C, and the processes 500A-500B in FIGS. 5A-5B can be performed in the multi-level hierarchy cache system 602, with the proxy cache controller circuits 120(0)-120(D) referenced therein being the proxy cache controller circuits 620(0)-620(D) in FIG. 6, and the global cache controller circuit 122 referenced therein being the global cache controller circuit 622 in FIG. 6.

With continuing reference, the processors 606(0)-606(D) are each coupled to the system bus 630 and can intercouple manager/subordinate or initiator/target devices included in the processor-based system 600. Although not illustrated in FIG. 6, multiple system buses 630 could be provided, wherein each system bus 630 constitutes a different fabric. As is well known, the processors 606(0)-606(D) can communicate with these other devices by exchanging address, control, and data information over the system bus 630. For example, the processors 606(0)-606(D) can communicate memory write and read requests to be serviced by the local cache memories 612(0)-612(D) and/or the system memory 618 as examples of slave devices through interaction with the respective proxy cache controller circuits 620(0)-620(D) and global cache controller circuit 622. The memory controller 629 is interfaced between the global cache controller circuit 622 and the system memory 618 and can be provided in one or more memory chips, such as dynamic random access memory (DRAM) chips for storing primary and/or redundant write data.

Other master and slave devices can be connected to the system bus 630 of the processor-based system 600. As illustrated in FIG. 6, these devices can include one or more input devices 632, one or more output devices 634, one or more network interface devices 636, and one or more display controllers 638, as examples. The input device(s) 632 can include any type of input device, including, but not limited to, input keys, switches, voice processors, etc. The output device(s) 634 can include any type of output device, including, but not limited to, audio, video, other visual indicators, etc. The network interface device(s) 636 can be any devices configured to allow exchange of data to and from a network 640. The network 640 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 636 can be configured to support any type of communications protocol desired.

The processors 606(0)-606(D) may also be configured to access the display controller(s) 638 over the system bus 630 to control information sent to one or more displays 642. The display controller(s) 638 sends information to the display(s) 642 to be displayed via one or more video processors 644, which process the information to be displayed into a format suitable for the display(s) 642. The display(s) 642 can include any type of display, including, but not limited to, a cathode ray tube (CRT), a liquid crystal display (LCD), a plasma display, a light emitting diode (LED) display, etc. The processors 606(0)-606(D) and their assigned local cache memory 612(0)-612(D), the proxy cache controller circuits 620(0)-620(D), the global cache controller circuit 622, the system memory 618, the network 640, the input devices 632, and/or the display controller 638 can include computer instructions 646 that are non-transitory computer-readable media 648 to control their respective functions.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of non-transitory computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A semiconductor die (die), comprising:
    a processor comprising:
        a plurality of central processing unit (CPU) cores; and
        a local cache memory comprising a plurality of cache memories each assigned to a CPU core of the plurality of CPU cores; and
    a proxy cache controller circuit communicatively coupled to the plurality of CPU cores; and
    the proxy cache controller circuit configured to:
        receive a memory access request comprising a memory address from a first CPU core of the plurality of CPU cores in response to the first CPU core not being able to service the memory access request in a first cache memory of the plurality of cache memories assigned to the first CPU core;
        determine if the memory access request is able to be serviced in any other cache memories of the plurality of cache memories assigned to the other CPU cores of the plurality of CPU cores; and in response to determining the memory access request is not able to be serviced in any of the other cache memories:

communicate the memory access request to a global cache controller circuit on a second die;

receive a valid cache state corresponding to the memory address in response to the global cache controller circuit determining that the memory access request is able to be serviced from another off-die cache memory; and update the valid cache state for the memory address associated with the memory access request.

2. The die of claim 1, wherein the proxy cache controller circuit is configured to:

receive the memory access request comprising a memory read request comprising a memory read address from the first CPU core of the plurality of CPU cores, in response to a cache line in the first cache memory corresponding to the memory read request being in an invalid state;

determine if the memory read request is a cache miss in each of the other cache memories of the plurality of cache memories assigned to the other CPU cores of the plurality of CPU cores; and in response to determining the memory read request is a cache miss in each of the other cache memories:

communicate the memory read request to the global cache controller circuit on the second die.

3. The die of claim 2, wherein, in response to determining the memory read request is a cache miss in each of the other cache memories, the proxy cache controller circuit is further configured to:

receive read data for the memory read request from the global cache controller circuit.

4. The die of claim 2, wherein, in response to determining the memory read request is a cache hit in a second cache memory of the plurality of cache memories, the proxy cache controller circuit is further configured to:

communicate a read snoop shared request to a second CPU core of the plurality of CPU cores assigned to the second cache memory; and cause read data for the memory read request to be communicated to the first CPU core;

wherein the first CPU core is configured to write the read data for the memory read request to the first cache memory.

5. The die of claim 4, wherein the proxy cache controller circuit is configured to cause the read data for the memory read request to be communicated to the first CPU core by being configured to cause the second CPU core to forward the read data for the memory read request to the first CPU core.

6. The die of claim 4, wherein the proxy cache controller circuit is configured to cause the read data for the memory read request to be communicated to the first CPU core by being configured to:

receive the read data for the memory read request from the second CPU core; and forward the read data for the memory read request to the first CPU core.

7. The die of claim 2, further comprising a local cache line directory comprising a plurality of local cache line entries each indexable by a memory address, and each comprising a cache state indicator indicating if a cache memory of the plurality of cache memories contains a valid cache line associated with its associated memory address;

wherein the proxy cache controller circuit is configured to determine if the memory read request is a cache miss by being configured to:

determine if the cache state indicator in a local cache line entry indexed by the memory read address of the memory read request in the local cache line directory indicates a presence of read data in each of the other cache memories of the plurality of cache memories assigned to the other CPU cores of the plurality of CPU cores.

8. The die of claim 4, further comprising a local cache line directory comprising a plurality of local cache line entries each indexable by a memory address, and each comprising a cache state indicator indicating if a cache memory of the plurality of cache memories contains a valid cache line associated with its associated memory address;

wherein:

the proxy cache controller circuit is configured to determine if the memory read request is a cache hit, by being configured to:

determine if the cache state indicator in a local cache line entry indexed by the memory read address of the memory read request in the local cache line directory indicates a presence of the read data in the second cache memory of the plurality of cache memories; and the proxy cache controller circuit is further configured to update the cache state indicator in the local cache line entry corresponding to memory read address of the memory read request in the local cache line directory to indicate the presence of the read data for the memory read address in the first cache memory assigned to the first CPU core.

9. The die of claim 1, wherein the proxy cache controller circuit is configured to:

receive the memory access request comprising a unique ownership request for a memory write request comprising a memory write address from the first CPU core of the plurality of CPU cores;

determine if write data for the memory write request is in a shared state in the other cache memories of the plurality of cache memories assigned to the other CPU cores of the plurality of CPU cores; and in response to determining the write data for the memory write request is in a shared state in one or more other cache memories of the plurality of cache memories:

issue a snoop clean invalidate to the one or more other cache memories of the plurality of cache memories to invalidate the write data corresponding to the memory write address of the memory write request in the one or more other cache memories; and communicate a unique ownership state for the memory write address of the memory write request to the first CPU core;

wherein the first CPU core is configured to store the write data for the memory write request to the first cache memory in response to receiving the unique ownership state for the memory write address of the memory write request.

10. The die of claim 9, wherein the proxy cache controller circuit is configured to receive the memory access request in response to a cache line in the first cache memory corresponding to the memory write request being in a shared state.

11. The die of claim 9, wherein the proxy cache controller circuit is configured to receive the memory access request in response to no cache lines in the first cache memory corresponding to the memory write request.

12. The die of claim 9, wherein:
the proxy cache controller circuit is further configured to, in response to determining the data for the memory write request is not owned by the proxy cache controller circuit:
communicate the unique ownership request for the memory write address of the memory write request to the global cache controller circuit; and
receive the unique ownership state for the memory write address of the memory write request; and
the first CPU core is configured to store the write data for the memory write request to the first cache memory in response to receiving the unique ownership state for the memory write address of the memory write request.

13. The die of claim 9, further comprising:
a local cache line directory comprising:
a plurality of local cache line entries each indexable by a memory address, and each comprising a cache state indicator indicating if a cache memory of the plurality of cache memories contains a valid cache line associated with its associated memory address; and
wherein the proxy cache controller circuit is configured to determine if the write data for the memory write request is in a shared state in the other cache memories of the plurality of cache memories, by being configured to:
determine if the cache state indicator in a local cache line entry indexed by the memory write address of the memory write request in the local cache line directory indicates a presence of the write data in each of the other cache memories of the plurality of cache memories assigned to the other CPU cores of the plurality of CPU cores; and
determine if the write data present in the other cache memories of the plurality of cache memories is in a shared state.

14. The die of claim 1, wherein the proxy cache controller circuit is further configured to:
receive the memory access request comprising a write back request comprising a memory write address and write data from the first CPU core of the plurality of CPU cores, in response to an eviction of a cache line from the first cache memory corresponding to the memory write address;
communicate the write back request to the global cache controller circuit; and
receive a write back response from the global cache controller circuit in response to the global cache controller circuit writing back the write data of the write back request to a system memory.

15. The die of claim 13, wherein, in response to receiving the write back response, the proxy cache controller circuit is configured to update a cache state for the memory write address to a shared state.

16. The die of claim 13, wherein the first CPU core is configured to invalidate the write data in the first cache memory.

17. The die of claim 1, wherein the proxy cache controller circuit is configured to:
receive a memory atomic request comprising a memory write address from the first CPU core of the plurality of CPU cores, in response to a cache line in the first cache memory assigned to the first CPU core being in an invalid state;

determine if the memory atomic request is a cache hit in a second cache memory of the plurality of cache memories assigned to another CPU core of the plurality of CPU cores; and
in response to determining the memory atomic request is a cache hit in the second cache memory, the proxy cache controller circuit is further configured to:
communicate a unique ownership request for the memory write address of the memory atomic request to the second CPU core;
receive read data for the memory write address in the second cache memory;
receive an atomic operation for the memory atomic request from the first CPU core;
perform the atomic operation on the read data to generate write data; and
store the write data.

18. The die of claim 1, wherein the proxy cache controller circuit is further configured to:
receive a memory atomic request comprising a memory write address from the first CPU core of the plurality of CPU cores, in response to a cache line in the first cache memory assigned to the first CPU core being in an invalid state;
determine if the memory atomic request is a cache miss in each of the other cache memories of the plurality of cache memories assigned to the other CPU cores of the plurality of CPU cores;
in response to determining the memory atomic request is a cache miss in each of the other cache memories, the proxy cache controller circuit is further configured to:
communicate the memory atomic request to the global cache controller circuit; and
receive a valid read data for the memory write address from the global cache controller circuit;
receive an atomic operation for the memory atomic request from the first CPU core;
perform the atomic operation on the read data to generate write data for the memory atomic operation; and
store the write data for the memory atomic operation.

19. A method of maintaining cache coherency in a multi-level hierarchy cache memory system, comprising:
receiving in a proxy cache controller circuit on a first die and communicatively coupled to a plurality of central processing unit (CPU) cores, a memory access request comprising a memory address from a first CPU core of the plurality of CPU cores in response to the first CPU core not being able to service the memory access request in a first cache memory of a plurality of cache memories assigned to the first CPU core;
determining if the memory access request is able to be serviced in any other cache memories of the plurality of cache memories assigned to each of the other CPU cores of the plurality of CPU cores; and
in response to determining the memory access request is not able to be serviced in any of the other cache memories:
communicating the memory access request to a global cache controller circuit on a second die;
receiving a valid cache state corresponding to the memory address in response to the global cache controller circuit determining that the memory access request is able to be serviced from another off-die cache memory; and
updating the valid cache state for the memory address associated with the memory access request.

20. A non-transitory computer-readable medium having stored thereon computer executable instructions which, when executed by a proxy cache controller circuit on a first die and communicatively coupled to a plurality of central processing unit (CPU) cores, cause the proxy cache controller circuit to:

receive in a memory access request comprising a memory address from a first CPU core of the plurality of CPU cores in response to the first CPU core not being able to service the memory access request in a first cache memory of a plurality of cache memories assigned to the first CPU core;

determine if the memory access request is able to be serviced in any other cache memories of the plurality of cache memories assigned to each of the other CPU cores of the plurality of CPU cores; and in response to determining the memory access request is not able to be serviced in any of the other cache memories:

communicate the memory access request to a global cache controller circuit on a second die;

receive a valid cache state corresponding to the memory address in response to the global cache controller circuit determining that the memory access request is able to be serviced from another off-die cache memory; and update the valid cache state for the memory address associated with the memory access request.

21. A processor-based system, comprising:

a first die, comprising:

a first processor comprising one or more first central processing unit (CPU) cores;

a first local cache memory comprising one or more first cache memories each assigned to a first CPU core of the one or more first CPU cores; and a first proxy cache controller circuit communicatively coupled to the one or more first CPU cores; and a second die, comprising:

a second processor comprising one or more second CPU cores;

a second local cache memory comprising one or more second cache memories each assigned to a second CPU core of the one or more second CPU cores; and a second proxy cache controller circuit communicatively coupled to the one or more second CPU cores; and a cache memory system, comprising:

a global cache controller circuit;

the first proxy cache controller circuit; and the second proxy cache controller circuit;

the first CPU core of the one or more first CPU cores configured to:

issue a memory access request to a memory address in a first cache memory of the one or more first cache memories assigned to the first CPU core;

communicate the memory access request to the first proxy cache controller circuit in response to the first CPU core not being able to service the memory access request in the first cache memory;

the first proxy cache controller circuit in the first CPU core configured to:

determine if the memory access request is able to be serviced in any first cache memory of the one or more first cache memories assigned to the other first CPU cores of the one or more first CPU cores; and in response to determining the memory access request is not able to be serviced in any of the other first cache memories:

communicate the memory access request to the global cache controller circuit;

the global cache controller circuit configured to:

determine if the memory access request is able to be serviced in any second cache memory of the one or more second cache memories;

in response to determining the memory access request is able to be serviced in a second cache memory of the one or more second cache memories:

communicate the memory access request to the second proxy cache controller circuit to be serviced in the second cache memory;

receive a valid cache state corresponding to the memory address in response to determining that the memory access request is able to be serviced in the second cache memory of the one or more second cache memories; and update the valid cache state for the memory address associated with the memory access request based on the serviced memory access request in the second local cache memory.

22. The processor-based system of claim 21, wherein:

the second proxy cache controller circuit is configured to:

receive the memory access snoop request from the global cache controller circuit; and forward the memory access snoop request to the second CPU core of the one or more second CPU cores assigned to the second cache memory of the one or more second cache memories; and the second CPU core is configured to:

service the memory access request from the second cache memory of the one or more second cache memories.

23. The processor-based system of claim 21, wherein:

the first proxy cache controller circuit in the first CPU core is configured to:

determine if the memory access request comprising a memory read request is a cache miss in each of the one or more first cache memories; and in response to determining the memory read request is a cache miss in each of the one or more first cache memories:

communicate the memory read request to the global cache controller circuit; and the global cache controller circuit is configured to:

determine if the memory read request is a cache miss in the second local cache memory; and in response to determining the memory read request is a cache miss in the second local cache memory:

issue a read snoop shared request for the memory read request to the second proxy cache controller circuit to be serviced in the second local cache memory; and update the valid cache state for the memory address associated with the memory read request based on the serviced memory read request in the second local cache memory.

24. The processor-based system of claim 23, wherein:

the second proxy cache controller circuit is configured to:

receive the read snoop shared request from the global cache controller circuit; and forward the read snoop shared request to the second CPU core of the one or more second CPU cores assigned to the second cache memory of the one or more second cache memories;

the second CPU core is configured to:

access the second cache memory of the one or more second cache memories at the memory address of the memory read request; and communicate read data at the memory address of the memory read request in the second cache memory to the second proxy cache controller circuit; and the second proxy cache controller circuit is configured to communicate the read data for the memory read request to at least one of the global cache controller circuit and the first proxy cache controller circuit.

25. The processor-based system of claim 23, wherein:

the first die further comprises a first local cache line directory comprising a plurality of first local cache line entries each indexable by a first memory address, and each comprising a first cache state indicator indicating if a first cache memory of the one or more first cache memories contains a valid cache line associated with its first memory address; and further comprising a global cache line directory comprising a plurality of global cache line entries each indexable by a memory address, and each comprising a global cache state indicator indicating a local cache memory containing a valid cache line associated with a second memory address;

the first proxy cache controller circuit is configured to determine if the memory read request is a cache miss by being configured to:

determine if the first cache state indicator in a first local cache line entry indexed by the memory address of the memory read request in the first local cache line directory indicates a presence of read data in any first cache memory of the one or more first cache memories; and the global cache controller circuit is configured to:

determine if the memory read request is a cache miss in the second local cache memory by being configured to:

determine if the global cache state indicator in a global cache line entry indexed by the memory address of the memory read request in the global cache line directory indicates the presence of the read data in the second local cache memory.

26. The processor-based system of claim 25, wherein:

the first proxy cache controller circuit is further configured to update the first cache state indicator in the first local cache line entry corresponding to the memory address of the memory read request in the first local cache line directory to indicate the presence of the read data for the memory address in the first cache memory assigned to the first CPU core; and the global cache controller circuit is further configured to update the global cache state indicator in the global cache line entry corresponding to the memory address of the memory read request in the global cache line directory to indicate the presence of the read data for the memory read request in the first local cache memory and the second local cache memory.

27. The processor-based system of claim 21, wherein:

the first proxy cache controller circuit is configured to:

receive the memory access request comprising a unique ownership request for a memory write request comprising a memory write address from the first CPU core of the plurality of CPU cores;

determine if write data for the memory write request is not owned by the first proxy cache controller circuit; and in response to determining the write data for the memory write request is not owned by the first proxy cache controller circuit:

communicate the unique ownership request for the memory write address of the memory write request to the global cache controller circuit; and the global cache controller circuit further configured to:

receive the unique ownership request for the memory write address of the memory write request issued by the first proxy cache controller circuit;

issue a snoop clean invalidate to the one or more other cache memories of the plurality of cache memories to invalidate the write data corresponding to the memory write address of the memory write request in the one or more other cache memories; and communicate a unique ownership state for the memory write address of the memory write request to the first proxy cache controller circuit;

the first proxy cache controller circuit is further configured to:

in response to receiving the unique ownership state for the memory write address of the memory write request, communicate the unique ownership state for the memory write address of the memory write request to the first CPU core; and the first CPU core is configured to store the write data for the memory write request to the first cache memory in response to receiving the unique ownership state for the memory write address of the memory write request.

28. The processor-based system of claim 27, further comprising:

a global cache line directory comprising a plurality of global cache line entries each indexable by a memory address, and each comprising a global cache state indicator indicating a local cache memory containing a valid cache line associated with a second memory address;

the global proxy cache controller circuit is configured to determine if the write data for the memory write request is in a shared state in the other cache memories of the plurality of cache memories, by being configured to:

determine if a global cache state indicator in a first global cache line entry indexed by the memory write address of the memory write request in the global cache line directory indicates a presence of the write data in each of the other cache memories of the plurality of cache memories assigned to the other CPU cores of the plurality of CPU cores; and in response to determining the write data is present in at least one of the cache memories of the plurality of cache memories assigned to the other CPU cores of the plurality of CPU cores, issue the snoop clean invalidate to the one or more other cache memories of the plurality of cache memories to invalidate the write data corresponding to the memory write address of the memory write request in the one or more other cache memories.

29. The processor-based system of claim 21, wherein the global cache controller circuit is further configured to:

store the write data for the memory write request in a system memory.

30. The processor-based system of claim 21, wherein:

the first proxy cache controller circuit is configured to:

receive a memory atomic request comprising a memory write address from the first CPU core of the plurality of CPU cores, in response to a cache line in the first cache memory assigned to the first CPU core being in an invalid state;

determine if the memory atomic request is a cache miss in each of the other cache memories of the plurality of cache memories assigned to the other CPU cores of the plurality of CPU cores;

in response to determining the memory atomic request is a cache miss in each of the other cache memories, the first proxy cache controller circuit is further configured to:

communicate the memory atomic request to the global cache controller circuit; and the global cache controller circuit is configured to:

receive an atomic operation for the memory atomic request from the first proxy cache controller circuit;

issue a memory read snoop request for the memory atomic request at the memory write address to a memory controller coupled to system memory;

receive valid read data stored at the memory write address in system memory;

perform the atomic operation on the read data to generate write data for the memory atomic operation; and store the write data in system memory for the memory atomic operation.

31. The processor-based system of claim 30, wherein the global cache controller circuit is further configured to communicate the write data to the first proxy cache controller circuit.

\* \* \* \* \*